(12) United States Patent
Park et al.

(10) Patent No.: US 12,386,358 B2
(45) Date of Patent: Aug. 12, 2025

(54) APPARATUS FOR DETECTING AND REMOVING DYNAMIC OBSTACLE FOR ROBOT AND OPERATING METHOD THEREOF

(71) Applicants: Yujin Robot Co., Ltd., Incheon (KR); Miele & Cie. KG, Gütersloh (DE)

(72) Inventors: Seong Ju Park, Incheon (KR); Myung Kyo Jeong, Incheon (KR); Jae Young Lee, Incheon (KR)

(73) Assignees: Yujin Robot Co., Ltd., Incheon (KR); Miele & Cie. KG, Gütersloh (DE)

( * ) Notice: Subject to any disclaimer, the term of this patent is extended or adjusted under 35 U.S.C. 154(b) by 209 days.

(21) Appl. No.: 18/316,167

(22) Filed: May 11, 2023

(65) Prior Publication Data
US 2024/0077881 A1 Mar. 7, 2024

Related U.S. Application Data

(63) Continuation of application No. PCT/KR2021/016525, filed on Nov. 12, 2021.

(30) Foreign Application Priority Data

Nov. 12, 2020 (KR) .......................... 10-2020-0151000
Jun. 7, 2021 (KR) .......................... 10-2021-0073734

(Continued)

(51) Int. Cl.
*G05D 1/00* (2024.01)
*G01C 21/00* (2006.01)
(Continued)

(52) U.S. Cl.
CPC ......... *G05D 1/0274* (2013.01); *G01C 21/206* (2013.01); *G01C 21/3848* (2020.08);
(Continued)

(58) Field of Classification Search
CPC .... G05D 1/0274; G05D 1/024; G01C 21/206; G01C 21/3848; G01C 21/383;
(Continued)

(56) References Cited

U.S. PATENT DOCUMENTS 9,254,571 B2    2/2016 Hyung et al.
2014/0316636 A1*  10/2014 Hong ................... G05D 1/0274
                                                901/1

(Continued)

FOREIGN PATENT DOCUMENTS

KR    10-2007-0120780 A    12/2007
KR    10-2012-0043096      5/2012

(Continued)

OTHER PUBLICATIONS

International Search Report for PCT/KR2021/016525 by Korean Intellectual Property Office dated Feb. 15, 2022.

(Continued)

*Primary Examiner* — Abby Lin
*Assistant Examiner* — Renee LaRose
(74) *Attorney, Agent, or Firm* — BROADVIEW IP LAW, PC

(57) ABSTRACT

The apparatus for detecting and removing a dynamic obstacle of a robot and the operating method thereof according to a predetermined exemplary embodiment detect and remove the dynamic obstacle while simultaneously performing the mapping and the localizing using the simultaneous localization and mapping (SLAM) technique to efficiently detect and remove a dynamic obstacle even in a situation in which a dynamic change of surrounding environment is severe and an environment to be localized is large.

14 Claims, 18 Drawing Sheets

(30) Foreign Application Priority Data

Jun. 7, 2021 (KR) .................. 10-2021-0073735
Nov. 10, 2021 (KR) .................. 10-2021-0153743

(51) Int. Cl.
*G01C 21/20* (2006.01)
*G06T 5/70* (2024.01)
*G06T 7/73* (2017.01)
*G06T 17/05* (2011.01)
*G06T 19/20* (2011.01)

(52) U.S. Cl.
CPC .............. *G05D 1/024* (2013.01); *G06T 5/70* (2024.01); *G06T 7/74* (2017.01); *G06T 7/75* (2017.01); *G06T 17/05* (2013.01); *G06T 19/20* (2013.01); *G06T 2200/24* (2013.01); *G06T 2207/20072* (2013.01); *G06T 2207/20101* (2013.01); *G06T 2219/2004* (2013.01); *G06T 2219/2008* (2013.01)

(58) Field of Classification Search
CPC ....... G06T 2200/24; G06T 2207/20072; G06T 2207/20101; G06T 2219/2004; G06T 2219/2008
See application file for complete search history.

(56) References Cited

U.S. PATENT DOCUMENTS

2017/0255203 A1* 9/2017 Sofman .................. G05D 1/024
2020/0306983 A1* 10/2020 Noh ...................... G01S 7/4802

FOREIGN PATENT DOCUMENTS

| KR | 10-2014-0126539 A | 10/2014 |
| KR | 10-2019-0070514 A | 6/2019 |
| KR | 10-2071575 B1 | 1/2020 |
| KR | 10-2020-0119394 A | 10/2020 |

OTHER PUBLICATIONS

Office Action for KR 10-2021-0073735 by Korean Intellectual Property Office dated Apr. 17, 2024.

Koide, Kenji et al. "Interactive 3D Graph SLAM for Map Correction," IEEE Robotics and Automation Letters, vol. 6, No. 1, Jan. 2021.

* cited by examiner old map old key frame new map new key frame

… (1)
APPARATUS FOR DETECTING AND REMOVING DYNAMIC OBSTACLE FOR ROBOT AND OPERATING METHOD THEREOF

CROSS-REFERENCE TO RELATED APPLICATIONS

This application is a continuation of pending PCT International Application No. PCT/KR2021/016525, filed on Nov. 12, 2021, which claims priority to Korean Patent Application No. 10-2020-0151000, filed on Nov. 12, 2020, Korean Patent Application No. 10-2021-0073734, filed on Jun. 7, 2021, Korean Patent Application No. 10-2021-0073735, filed on Jun. 7, 2021, and Korean Patent Application No. 10-2021-0153743, filed on Nov. 10, 2021, the entire contents of which are hereby incorporated by references in its entirety.

TECHNICAL FIELD

The present disclosure relates to a robot system, and more particularly, to an apparatus and a method for localizing a robot having robustness to a dynamic environment which estimate a position of a robot using a simultaneous localization and mapping (SLAM) technique.

Further, the present disclosure relates to a robot system, and more particularly to an apparatus and a method for editing 3D SLAM data which edit 3D simultaneous localization and mapping (SLAM) data.

Further, the present disclosure relates to a robot system and more particularly, to an apparatus for detecting and removing a dynamic obstacle of a robot and an operating method thereof which detect and remove a dynamic obstacle while simultaneously performing mapping and localization using the simultaneous localization and mapping (SLAM) technology.

DESCRIPTION OF THE RELATED ART

FIG. 1 is a view for explaining a process of localizing a robot of the related art. Referring to FIG. 1, most of the robot localizing systems is configured by a system which performs map building first and then perform localization of the robot based on the obtained map. In order to increase the accuracy after the map building, a user corrects and supplements the map by an additional manual task. Thereafter, the localization of the robot is performed using the well-prepared map. That is, the accuracy of the map is increased by dividing the map building and the localization to increase the accuracy of the localization. In a small space, if there is a little change in the environment in the space, appropriate results may be guaranteed in this way. However, in a situation where various objects frequently change in a large-size environment, such as a factory, the result cannot be guaranteed. This is because it is not only difficult to determine whether the object is a dynamic object to determine whether to add the dynamic object to the map building, it is but also difficult to perform the map building by distinguishing the dynamic object from a static object. Further, even though in the huge environment, the map building is satisfactorily performed, the accuracy of the robot localization may be insufficient due to the accuracy limit of the map.

In the related art, when the map is incorrectly configured or when the environment changes after drawing the map so that the existing map cannot be used, there is a problem in that a new map needs to be drawn from the beginning. In order to solve this problem, when the map is screwed or a new structure is created, a map editor is used to reflect this to the existing map without newly drawing a map. An existing map editor does not edit 3D simultaneous localization and mapping data, such as a key frame or an edge, but is used to modify a 2D grid map which is finally obtained by an optimization process of a graph configured thereby. However, there is a problem in that the existing map is a 2D map so that obstacles or structures of a 3D space could not be edited. Further, it is difficult to directly access the key frame and the edge to edit the map so that if a noise is input or a wrong edge is included during the SLAM process, a graph needs to be configured again and the map needs to be drawn by the SLAM again to obtain a correct graph.

When the dynamic obstacle is not removed, the robot may unnecessarily plan a detour path or have a difficulty to localize. In the related art, in order to remove the dynamic obstacle, the localization and mapping cannot be simultaneously performed or the dynamic obstacle is manually removed from the map after mapping. However, this method increases the time and cost of the user and the method is manually performed so that there may be a side effect that the map is destroyed due to the user's error. Further, when the map is changed, the map needs to be created again and in a complex environment such as factories or warehouses, it is difficult to manually distinguish a dynamic obstacle from a still obstacle. Therefore, development of a technique which detects and removes the dynamic obstacle while perform the simultaneous localization and mapping (SLAM) is necessary.

SUMMARY

An object to be achieved by the present disclosure is to provide an apparatus and a method for localizing a robot having robustness to dynamic environments which simultaneously perform an operation of localizing a robot and an operation of updating a map using a simultaneous localization and mapping (SLAM) technique.

Further, an object to be achieved by the present disclosure is to provide an apparatus and a method for editing 3D SLAM data which directly edit a key frame or an edge of 3D SLAM data by user's manipulation, update the 3D SLAM data by optimizing a pose graph of the 3D SLAM data based on the key frame or the edge edited by the user's manipulation to generate a 2D grid map corresponding to the 3D SLAM data based on the updated 3D SLAM data.

Further, an object to be achieved by the present disclosure is to provide an apparatus for detecting and removing a dynamic obstacle of a robot and an operating method thereof which detect and remove a dynamic obstacle while simultaneously performing mapping and localization using the simultaneous localization and mapping (SLAM) technology.

Other and further objects of the present disclosure which are not specifically described can be further considered within the scope easily deduced from the following detailed description and the effect.

In order to achieve the above-described objects, according to an aspect of the present disclosure, an apparatus for detecting and removing a dynamic obstacle of a robot includes a storage unit which stores a map configured by cells with a predetermined size and configured by a 3D coordinate space; a tracking management unit which when sensor data is received from a sensor mounted in a robot, inputs the sensor data to the map, updates accumulated detecting time information of the cell based on a cell detected by the sensor data for every cell of the map, and updates the cell tracking information for every cell of the map based on whether the laser obtained from the sensor data passes through the cell; a dynamic obstacle detection unit which is updated by the tracking management unit and acquires whether the cell is a dynamic obstacle based on the accumulated detecting time information for every cell of the map and the tracking information; and a dynamic obstacle removing unit which removes data corresponding to a cell which is detected as a dynamic obstacle by the dynamic obstacle detection unit from the map.

Here, the tracking management unit acquires initial time information of the cell which is initially sensed, among cells sensed by the sensor data and updates the accumulated sensing signal information based on the minimum time information of the remaining cell.

Here, the tracking information includes first tracking information indicating how many times the laser is focused on the cell and second tracking information indicating how many times the laser passes though the cell, and the tracking management unit increases second tracking information of a cell through which the laser passes by a predetermined unit and increases the first tracking information of a cell on which the laser is focused, based on the sensor data.

Here, the tracking management unit acquires a weight based on a distance between the cell and the sensor and a resolution of the sensor and acquires the first tracking information and the second tracking information of the cell using the weight.

Here, the dynamic obstacle detection unit detects whether a cell whose accumulated sensing time information is larger than a predetermined reference time is a dynamic obstacle based on an obstacle presence probability and first tracking information and the obstacle presence probability is acquired based on the first tracking information and the second tracking information.

Here, the dynamic obstacle detection unit detects a cell in which the obstacle presence probability is equal to or lower than a predetermined first reference value and the first tracking information is equal to or lower than a predetermined second reference value as a dynamic obstacle.

Here, the obstacle presence probability is obtained by dividing the first tracking information by a sum of the first tracking information and the second tracking information.

Here, when the sensor data is provided from a sensor mounted in the robot, the tracking management unit corrects a position of the sensor data, inputs the sensor data from which the position is corrected to the map, updates accumulated sensing time information of the cell based on the sensor data from which the position is corrected, and updates the tracking information of the cell based on the sensor data from which the position is corrected.

In order to achieve the above-described objects, according to an aspect of the present disclosure, an apparatus for localizing a robot having robustness to a dynamic environment includes a map building unit which builds a map; a localizing unit which acquires a first feature from sensor data acquired by a sensor mounted in a robot and localizes the robot using the first feature acquired from the sensor data based on the map built by the map building unit; and a map updating unit which corrects an error of the first feature acquired by the localizing unit due to the movement of the robot using the position of the robot estimated by the localizing unit and updates the map using the corrected first feature based on the map built by the map building unit.

Here, the map updating unit updates the map using the corrected first feature and performs the pose graph optimization based on the updated map to acquire a pose graph corresponding to the updated map.

Here, the map updating unit acquires a key frame associated with a second feature of the map corresponding to the corrected first feature and updates the key frame using the first feature to update the map.

Here, the map updating unit removes the key frame which is changed more than the predetermined reference value due to the first feature, among acquired key frames, from the map and updates the key frame which is changed less than the reference value due to the first feature, among the acquired key frames, using the first feature.

In order to achieve the above-described objects, according to an aspect of the present disclosure, a 3D SLAM data editing apparatus is a 3D SLAM data editing apparatus which directly edits 3D SLAM data by user's manipulation, including an editing unit which edits a key frame or an edge of the 3D SLAM data; an updating unit which optimizes a pose graph of the 3D SLAM data based on the key frame and the edge edited by the editing unit to update the 3D SLAM data; and a management unit which generates a 3D grid map corresponding to the 3D SLAM data based on the 3D SLAM data updated by the updating unit.

According to the apparatus and method for localizing a robot having robustness to a dynamic environment according to a first exemplary embodiment of the present disclosure, an operation of localizing a robot and an operation of updating a map are performed together using the simultaneous localization and mapping (SLAM) technique to reflect changes of the map due to long-term dynamic object or a change of a static object to the map so that even in the dynamic environment, the map can be smoothly built and thus an improved robot localization performance may be ensured.

Further, an apparatus and a method for editing 3D SLAM data according to a second exemplary embodiment of the present disclosure directly edits a key frame or an edge of simultaneous localization and mapping (SLAM) data by the user's manipulation, optimizes a pose graph of the 3D SLAM data based on the key frame and the edge edited by the user's manipulation, and generates a 2D grid map corresponding to the 3D SLAM data based on the updated 3D SLAM data to improve the convenience of the user for editing the 3D SLAM data.

Further, according to the apparatus for detecting and removing a dynamic obstacle of a robot and an operating method thereof according to a predetermined exemplary embodiment, the dynamic obstacle is detected and removed while simultaneously performing the mapping and the localizing using the simultaneous localization and mapping (SLAM) technique to efficiently detect and remove a dynamic obstacle even in a situation in which a dynamic change of surrounding environment is severe and an environment to be localized is large.

The effects of the present disclosure are not limited to the technical effects mentioned above, and other effects which are not mentioned can be clearly understood by those skilled in the art from the following description.

DETAILED DESCRIPTION OF THE EMBODIMENT

Figure 1:
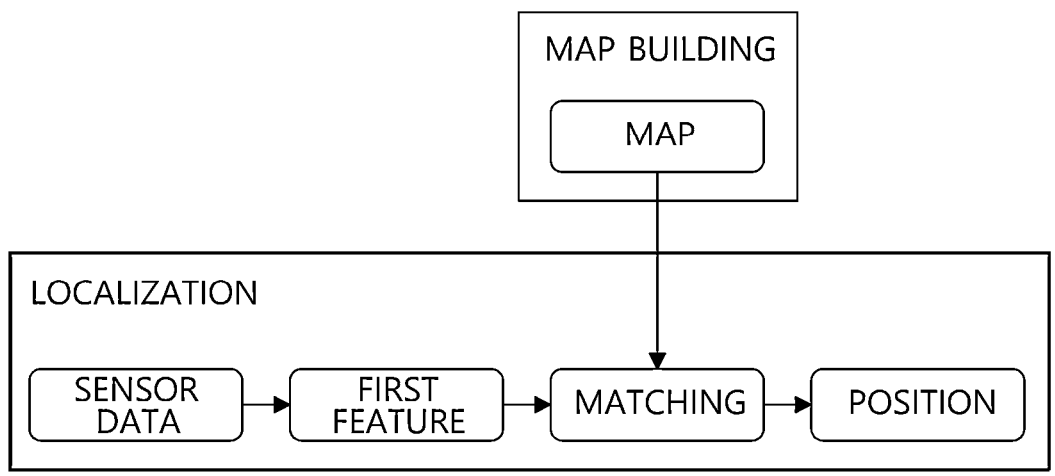
FIG. 1 is a view for explaining a process of localizing a robot of the related art.

Hereinafter, embodiments of the present disclosure will be described in detail with reference to the accompanying drawings. Advantages and features of the present disclosure, and methods for accomplishing the same will be more clearly understood from exemplary embodiments described below with reference to the accompanying drawings. However, the present disclosure is not limited to exemplary embodiments disclosed herein but will be implemented in various different forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims. Like reference numerals generally denote like elements throughout the specification.

Unless otherwise defined, all terms (including technical and scientific terms) used in the present specification may be used as the meaning which may be commonly understood by the person with ordinary skill in the art, to which the present disclosure belongs. It will be further understood that terms defined in commonly used dictionaries should not be interpreted in an idealized or excessive sense unless expressly and specifically defined.

In the specification, the terms "first" or "second" are used to distinguish one component from the other component so that the scope should not be limited by these terms. For example, a first component may be referred to as a second component, and similarly, a second component may be referred to as a first component.

In the present specification, in each step, numerical symbols (for example, a, b, and c) are used for the convenience of description, but do not explain the order of the steps so that unless the context apparently indicates a specific order, the order may be different from the order described in the specification. That is, the steps may be performed in the order as described or simultaneously, or an opposite order.

In this specification, the terms "have", "may have", "include", or "may include" represent the presence of the characteristic (for example, a numerical value, a function, an operation, or a component such as a part"), but do not exclude the presence of additional characteristic.

The term "unit" used in the specification refers to a software or hardware component such as a field programmable gate array (FPGA) or an ASIC and "unit" performs some functions. However, "~unit" is not limited to the software or the hardware. "~unit" may be configured to be in an addressable storage medium or may be configured to reproduce one or more processors. Accordingly, as an example, "~unit" includes components such as software components, object oriented software components, class components, and task components, processes, functions, attributes, procedures, subroutines, segments of a program code, drivers, a firmware, a microcode, a circuit, data, database, and data structures. A function which is provided in the components and "~units" may be combined with a smaller number of components and "~units" or divided into additional components and "~units".

Hereinafter, a robot system according to the present disclosure will be described in detail with reference to the accompanying drawing.

A robot system according to the present disclosure estimates a position of a robot, edits 3D SLAM data, and detects and removes a dynamic obstacle.

<First Exemplary Embodiment: Apparatus and Method for Localizing Robot Robustness to Dynamic Environment>

Apparatus and method for localizing a robot having robustness to a dynamic environment which is a first exemplary embodiment of a robot system according to the present disclosure will be described in detail with reference to FIGS. 2 to 9.

First, an apparatus for localizing a robot having robustness to a dynamic environment according to a first embodiment of the present disclosure will be described with reference to FIG. 2.

Figure 2:
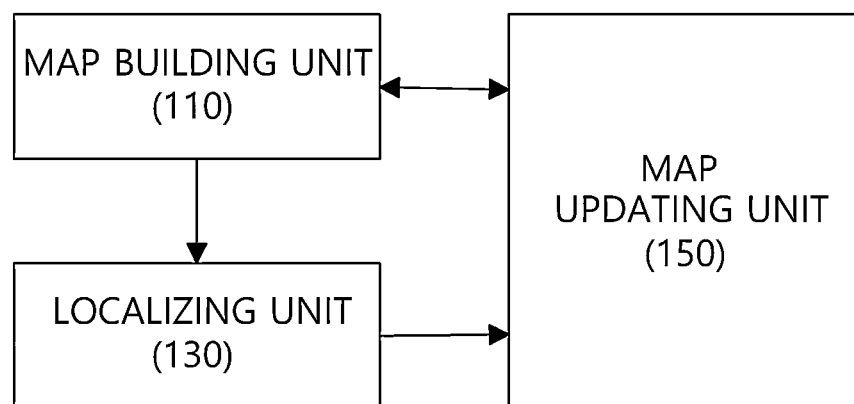
FIG. 2 is a block diagram for explaining an apparatus for localizing a robot having robustness to a dynamic environment according to a first exemplary embodiment of the present disclosure.

FIG. 2 is a block diagram for explaining an apparatus for localizing a robot having robustness to a dynamic environment according to a first exemplary embodiment of the present disclosure.

Referring to FIG. 2, an apparatus for localizing a robot having robustness to a dynamic environment according to a first exemplary embodiment of the present disclosure (hereinafter, referred to as a "robot localizing apparatus) 100 performs an operation of localizing a robot and an operation of updating a map together using a simultaneous localization and mapping (SLAM) technique.

That is, the system of the related art only localizes a robot using the map, as illustrated in FIG. 1, but does not update the map using a current feature obtained from sensor data. The feature used for localization is obtained based on information before localization so that when the map is updated, an error may be added to the existing map due to the error.

Accordingly, according to the present disclosure, unlike the system of the related art, an operation of updating a map is added to correct the map in real time. At this time, before updating the map, the map is updated after removing a dynamic object.

Accordingly, according to the present disclosure, in a situation in which a dynamic change of surrounding environments is severe and an environment to be localized is large, the robot is localized with robustness.

To this end, the robot localizing apparatus 100 includes a map building unit 110, a localizing unit 130, and a map updating unit 150.

The map building unit 110 builds a map based on the SLAM technique.

The localizing unit 130 acquires a first feature from sensor data acquired from a sensor mounted in a robot and localizes a robot using the first feature acquired from the sensor data based on the map build by the map building unit 110.

The map updating unit 150 corrects an error caused by the movement of the robot by updating the first feature acquired by the localizing unit 130 using a position of the robot estimated by the localizing unit 130 and updates the map using the corrected first feature based on the map build by the map building unit 110.

For example, the first feature acquired by the localizing unit 130 has been acquired based on the position of the robot before being corrected so that the map updating unit 150 may correct the first feature based on a difference of a position of the robot corrected by the localizing unit 130 and the position of the robot before being corrected.

That is, the map updating unit 150 may update the map using the corrected first feature.

To be more specific, the map updating unit 150 may acquire a key frame associated with a second feature of the map corresponding to the corrected first feature from the map.

For example, the second feature of the map is included in the map together with the position of the robot before being corrected. Accordingly, the second feature associated with the first feature which is corrected through the currently corrected position of the robot is acquired from the map. The first feature is obtained based on the currently corrected position of the robot and the second feature is obtained based on the position of the robot before being corrected so that it is determined that the second feature is associated with the first feature.

Here, when the first feature is different from the second feature, the map updating unit 150 compares the first feature and the second feature to determine whether to add the first feature to the map and when the first feature is added to the map, a key frame associated with the second feature is acquired from the map.

At this time, the map updating unit 150 determines whether the first feature is different from the second feature based on at least one of a variation of point density and a shape of the feature.

That is, the map updating unit 150 may determine whether the first feature and the second feature are different by the following processes.
1. Select first feature associated with second feature through current robot position
2. Compare 3D normal distribution, density, and covariance of first feature and second feature which are associated.
3. It is determined that first feature and second feature are different when difference in process 2 is larger than predetermined threshold.

For example, as a result of comparing the first feature and the second feature, when a variation of point density is larger than the threshold or a shape of the feature is changed, the map updating unit 150 determines that the first feature and the second feature are different.

Further, the map updating unit 150 compares the first feature and the second feature based on a change inducing level of the map due to the feature to determine whether to add the first feature to the map.

Here, the change inducing level of the map refers to a ratio of different first feature and second feature of all the first features and second features. When the associated first feature and second feature are different, it is determined that the change of the map is induced.

For example, when a change inducing level of the map due to the first feature is higher than a change inducing level of the map due to the second feature, the map updating unit 150 may determine to add the first feature to the map.

That is, when the first feature is not in the second feature, the map updating unit 150 immediately adds the first feature to the map. The map updating unit 150 may add a first feature having a change inducing level of the map which is equal to or larger than the predetermined reference value, among the first features associated with the second feature, to a corresponding second feature portion (a second feature of a corresponding portion is replaced with the first feature). The map updating unit 150 mixes the first feature having the change inducing level of the map which is lower than a predetermined reference value, among the first features associated with the second feature, with the corresponding second feature portion. Here, the mixing means that data of the first feature and data of the second data are combined. However, it does not mean that data are simply added, but means that the 3D normal distribution, the density, and the covariance are calculated again.

Further, the map updating unit 150 may update the map by updating the acquired key frame using the first feature.

Here, the map updating unit 150 removes the key frame which is changed more than the predetermined reference value due to the first feature, among acquired key frames, from the map and updates the key frame which is changed less than the reference value due to the first feature, among the acquired key frames, using the first feature. At this time, when the key frame is removed from the map, the map updating unit 150 adds a new key frame configured by the first feature to the map.

For example, the key frame includes information of a position of the robot and related features. When among the second features included in the key frame, there are many second features to be removed due to the newly acquired first feature (when a number of second features is equal to or larger than a threshold value), the corresponding key frame is removed. A new key frame which is configured by the first feature is added to the removed key frame. If not, the second feature is updated using the first feature so that the key frame is also updated.

The map updating unit 150 performs pose graph optimization based on the updated map to acquire a pose graph corresponding to the updated map.

As described above, according to the present disclosure, the first feature obtained from the static object is updated by the estimated position of the robot to correct the error due to the movement of the robot and the corrected first feature matches the existing map. When the information is the same as the existing map, the first feature is supplemented and when the information is not in the existing map, the first feature is added. At this time, when the key frame is added, the key frame is not simply added, but the pose graph optimization which is a relationship with the existing key frame is performed to update the map.

Accordingly, the map is not fixed to be used while localizing the robot, but is consistently supplemented while localizing the robot. Further, the pose graph optimization is also performed so that an optimal map may be maintained beyond simply supplementing the information of the existing map.

Accordingly, the present disclosure ensures the robust robot localization which exceeds the limit in which the accuracy of localization is lowered in a dynamic environment of the conventional system.

Now, an operation of localizing the robot and updating the map according to the first exemplary embodiment of the present disclosure will be described with reference to FIGS. 3 to 5.

Figure 3:
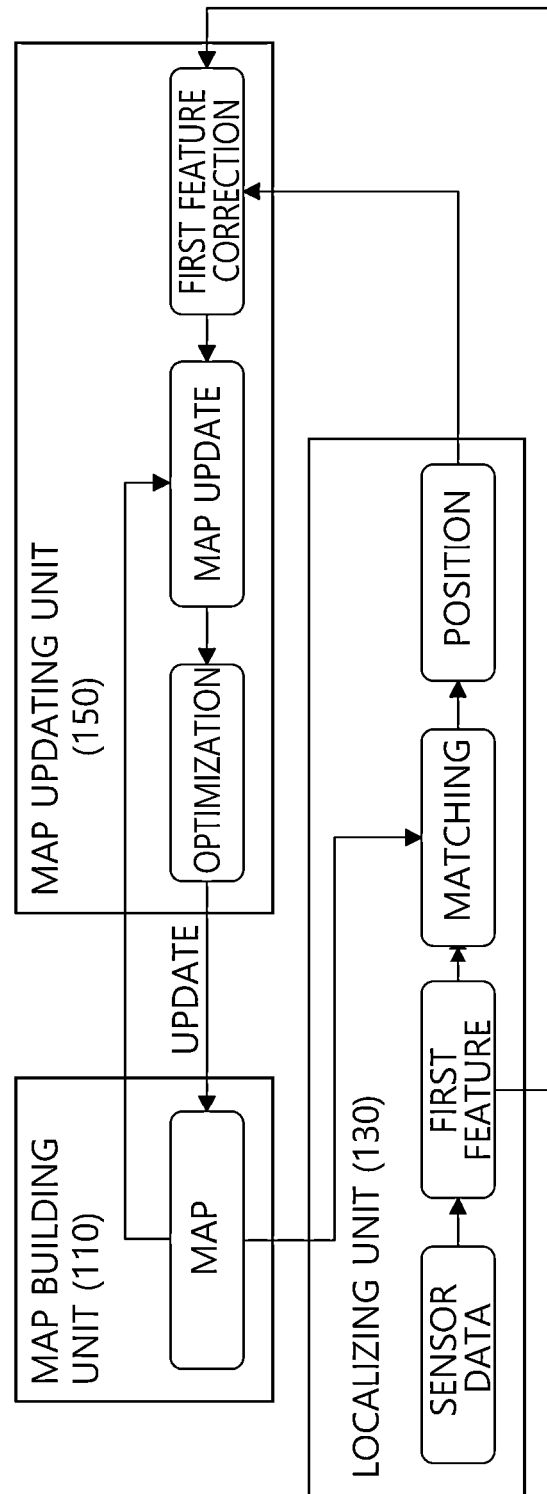
FIG. 3 is a view for explaining a process of localizing a robot and updating a map according to a first exemplary embodiment of the present disclosure.
Figure 4:
FIG. 4 is a view illustrating a map example before updating a map according to a first exemplary embodiment of the present disclosure.
Figure 5:
FIG. 5 is a view illustrating a map example after updating a map according to a first exemplary embodiment of the present disclosure.

FIG. 3 is a view for explaining a process of localizing a robot and updating a map according to a first exemplary embodiment of the present disclosure, FIG. 4 is a view illustrating a map example before updating a map according to a first exemplary embodiment of the present disclosure, and FIG. 5 is a view illustrating a map example after updating a map according to a first exemplary embodiment of the present disclosure.

Referring to FIG. 3, the localizing unit 130 acquires a first feature from sensor data acquired by the sensor mounted in the robot and matches the first feature and the map to localize the robot.

The localizing unit 130 provides the feature acquired from the sensor data and the estimated position of the robot to the map updating unit 150.

By doing this, the map updating unit 150 updates the map of the map building unit 110 by correcting the first feature using the estimated position of the robot, updating the map using the corrected first feature, and performing the pose graph optimization based on the updated map.

The map updating data will be described. The map updating unit 150 acquires a second feature of the map corresponding to the corrected first feature and identifies whether the first feature and the second feature are different.

When the first feature is different from the second feature, the map updating unit 150 identifies whether to add the first feature to the map.

When the first feature is added to the map, the map updating unit 150 acquires a key frame associated with the second feature from the map.

Next, when the acquired key frame is a key frame which is changed to a predetermined reference value or more due to the first feature, the map updating unit 150 removes the key frame from the map and adds a new key frame formed by the first feature to the map. In contrast, when the acquired key frame is a key frame which is changed to lower than a predetermined reference value due to the first feature, the map updating unit 150 may update the key frame using the first feature.

Accordingly, the robot localizing apparatus 100 according to the present disclosure simultaneously localizes the robot based on the map and updates the map as illustrated in FIG. 4 to a map as illustrated in FIG. 5.

As described above, the key to updating the map according to the present disclosure lies in adding and removing the key frame. When the key frame is just added, the complexity of the optimization is increased due to the increased complexity of the pose graph due to the increased key frame so that a computation amount of the optimization is increased, which increases the failure of the optimization. Accordingly, the key frame is not simply added, but after checking whether the oldest key frame exists around the robot before adding the key frame, the oldest key frame is removed and then a new key frame needs to be added again.

That is, it is considered that the old key frame and the new key frame are replaced one to one. When the key frame is removed, the features belonging to the key frame are also removed so that it means that old map information is removed. When the key frame is added, the features belonging to the key frame are also added so that it means that new map information is added. Accordingly, the old map information is removed and new map information is added. However, as the key frame is changed, the pose graph optimization is performed again so that the entire map is supplemented.

As described above, according to the robust map building, changes of the map due to the long-term dynamic objects or changes of the static object which have not been added to the map obtained during an initial map building process are reflected to the map so that even in the dynamic environment, the map can be smoothly built and thus the more improved robot localization performance may be ensured.

Here, the long-term dynamic object does not simply refer to a moving object, but refers to an object which is fixed in a specific position for a predetermined time or longer to become still map information for a while.

Now, a method for localizing a robot having robustness to a dynamic environment according to a first embodiment of the present disclosure will be described with reference to FIGS. 6 to 9.

Figure 6:
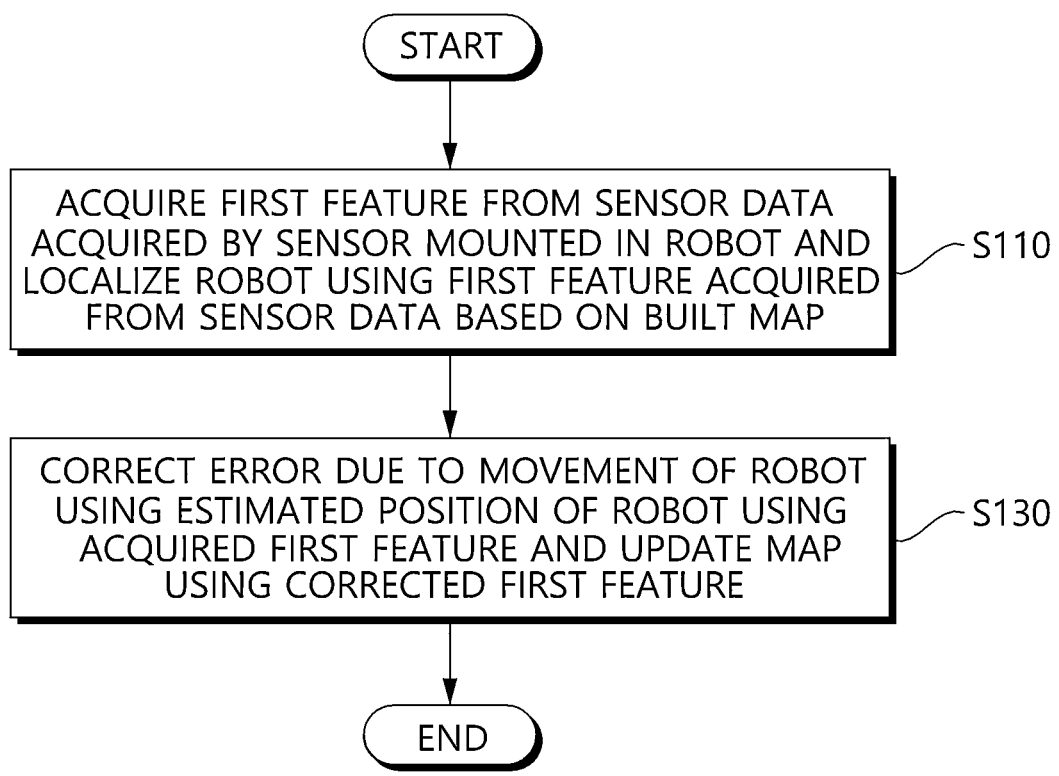
FIG. 6 is a block diagram for explaining a method for localizing a robot having robustness to a dynamic environment according to a first exemplary embodiment of the present disclosure.

FIG. 6 is a block diagram for explaining a method for localizing a robot having robustness to a dynamic environment according to a first exemplary embodiment of the present disclosure.

Referring to FIG. 6, the robot localizing apparatus 100 acquires a first feature from sensor data acquired from a sensor mounted in the robot and localizes the robot using the first feature acquired from the sensor data based on the built map (S110).

Next, the robot localizing apparatus 100 corrects an error caused by the movement of the robot by updating the first feature acquired by the localizing unit 130 using a position of the robot estimated by the localizing unit 130 and updates the map using the first feature based on the map (S130).

Figure 7:
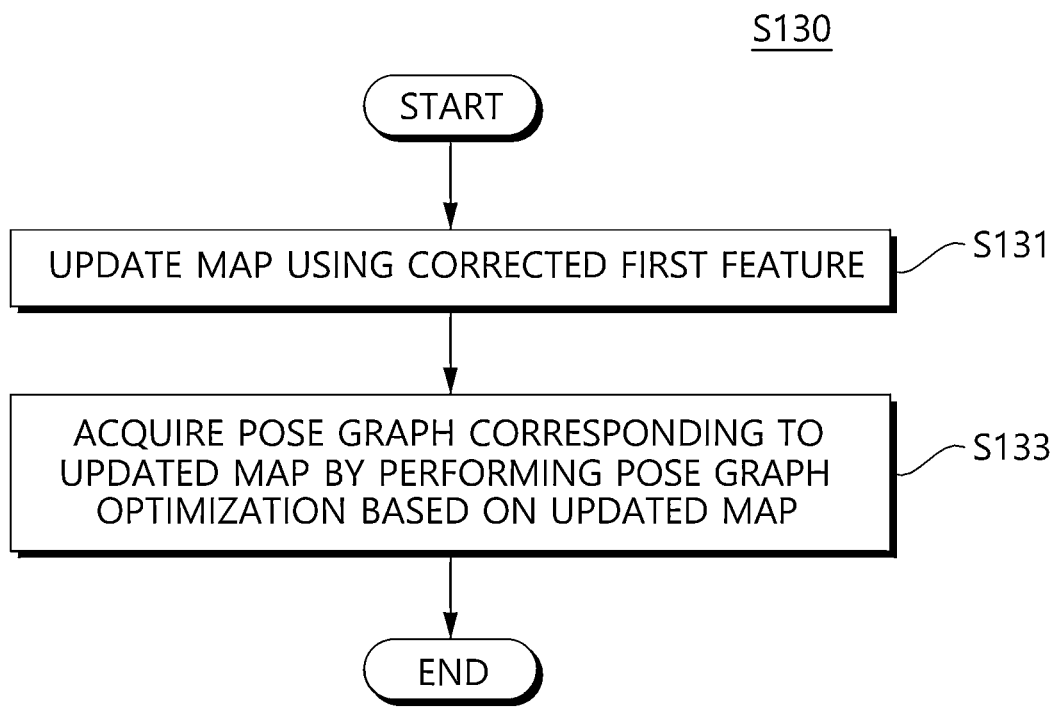
FIG. 7 is a flowchart for explaining a sub step of a map updating step S130 illustrated in FIG. 6.

FIG. 7 is a flowchart for explaining a sub step of a map updating step S130 illustrated in FIG. 6.

Referring to FIG. 7, the robot localizing apparatus 100 updates the map using the corrected first feature (S131).

Next, the robot localizing apparatus 100 performs pose graph optimization based on the updated map to acquire a pose graph corresponding to the updated map (S133).

Figure 8:
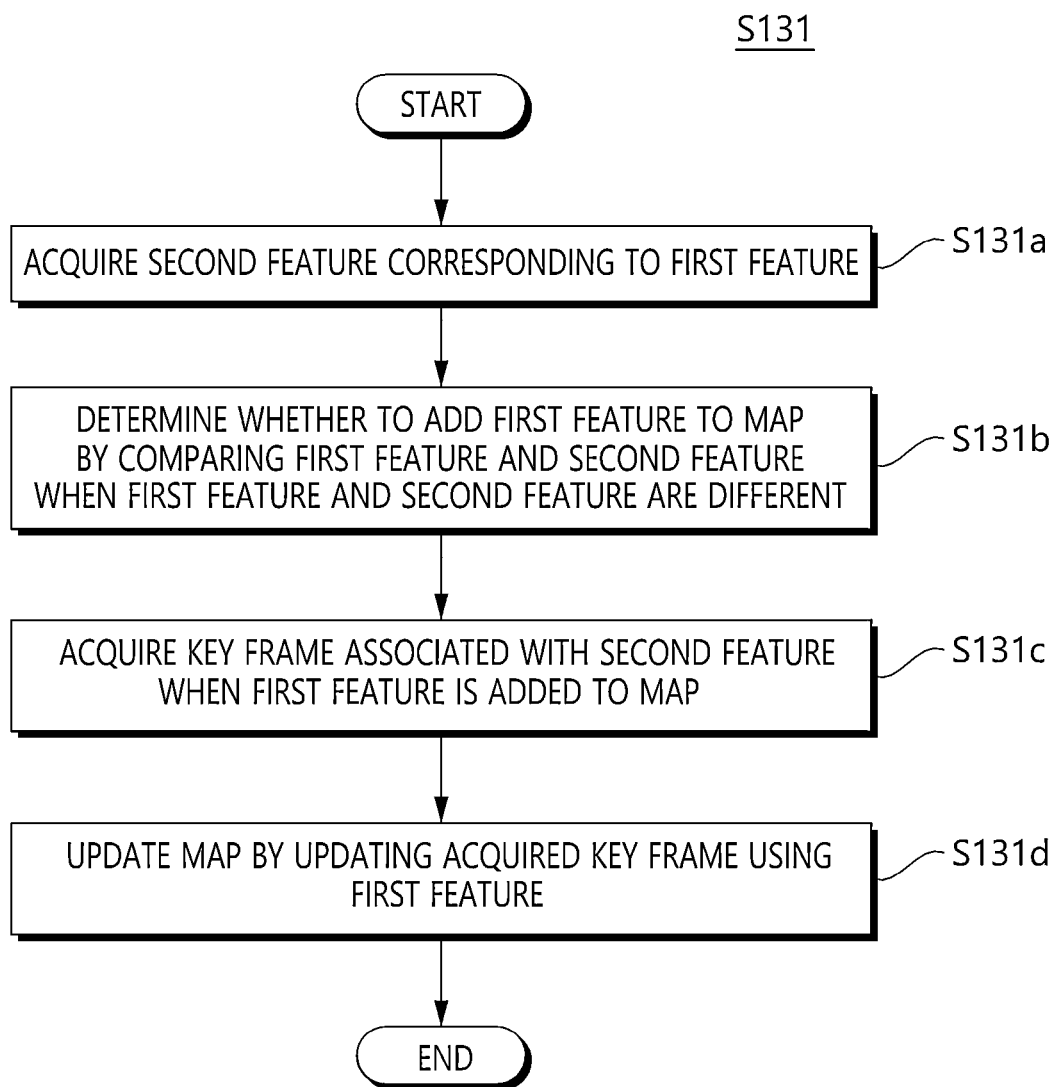
FIG. 8 is a flowchart for explaining a sub step of a map updating step S130 illustrated in FIG. 7.

FIG. 8 is a flowchart for explaining a sub step of a map updating step S130 illustrated in FIG. 7.

Referring to FIG. 8, the robot localizing apparatus 100 acquires a second feature of the map corresponding to the first feature (S131*a*).

Next, when the first feature and the second feature are different, the robot localizing apparatus 100 compares the first feature and the second feature to determine whether to add the first feature to the map (S131*b*). At this time, the robot localizing apparatus 100 determines whether the first feature is different from the second feature based on at least one of a variation of point density and a shape of the feature. Further, the robot localizing apparatus 100 compares the first feature and the second feature based on a change inducing level of the map due to the feature to determine whether to add the first feature to the map.

When the first feature is added, the robot localizing apparatus 100 acquires a key frame associated with the second feature from the map (S131*c*).

Next, the robot localizing apparatus 100 updates the acquired key frame using the first feature to update the map (S131*d*).

Figure 9:
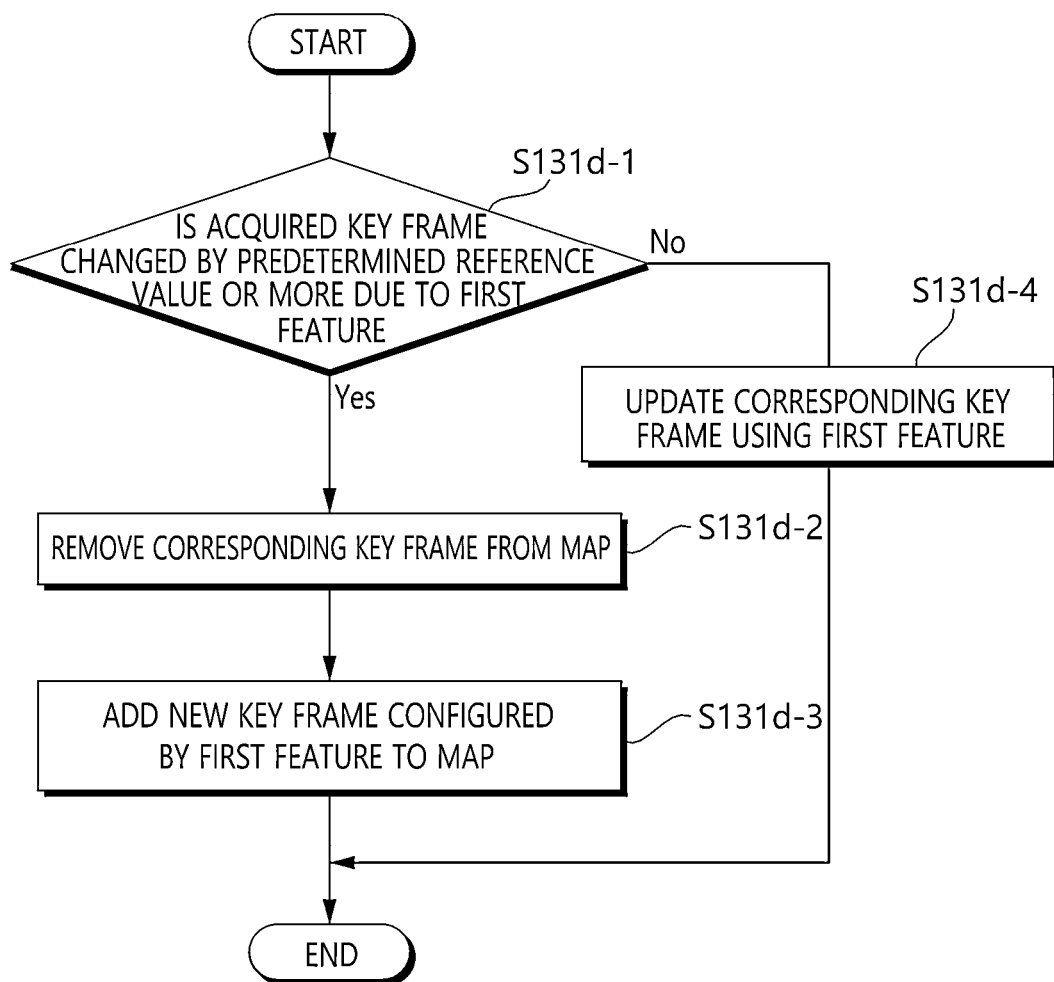
FIG. 9 is a flowchart for explaining a sub step of a map updating step S130d illustrated in FIG. 8.

FIG. 9 is a flowchart for explaining a sub step of a map updating step S130*d* illustrated in FIG. 8.

Referring to FIG. 9, when the acquired key frame is a key frame which is changed to a predetermined reference value or more due to the first feature (S131*d*-1-Y), the robot localizing apparatus 100 removes the key frame from the map (S131*d*-2).

Next, the robot localizing apparatus 100 adds a new key frame configured by the first feature to the map (S131*d*-3).

In contrast, when the acquired key frame is not a key frame which is changed to a predetermined reference value or more due to the first feature (S131*d*-1-N), the robot localizing apparatus 100 updates the key frame from the map (S131*d*-4).

<Second Exemplary Embodiment: 3D SLAM Data Editing Apparatus and Method>

3D SLAM data editing apparatus and method which are a second exemplary embodiment of a robot system according to the present disclosure will be described in detail with reference to FIGS. 10 to 16.

Figure 10:
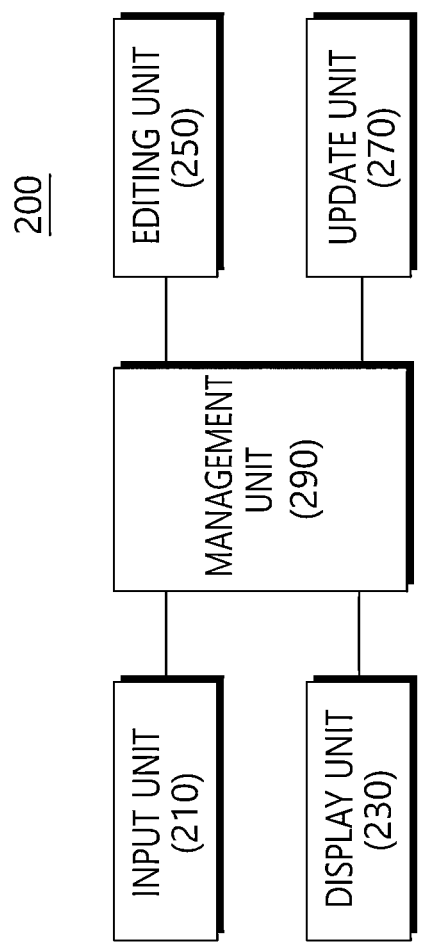
FIG. 10 is a block diagram for explaining a 3D SLAM data editing apparatus according to a second exemplary embodiment of the present disclosure.

First, a 3D SLAM data editing apparatus according to a second embodiment of the present disclosure will be described with reference to FIG. 10. FIG. 10 is a block diagram for explaining a 3D SLAM data editing apparatus according to a second exemplary embodiment of the present disclosure.

Referring to FIG. 10, the 3D SLAM data editing apparatus 200 according to the second exemplary embodiment of the present disclosure directly edits 3D SLAM data by the manipulation of the user.

Here, 3D data is data which configures a map based on a graph based simultaneous localization and mapping (SLAM) algorithm and includes a key frame representing a node of the graph, a vertex, and an edge representing a relationship between nodes (that is, key frames). For example, when the user performs the mapping process in the SLAM mode, key frame data which is a node of the graph and edge data which is a connection relationship between the key frames may be obtained and the map is configured by a process of optimizing a relationship of them (key frame data and edge data).

The key frame is information representing the node of the graph and includes unique identification information (ID) of the key frame, a position (pose) of the key frame, a covariance of the key frame, a pdist of the key frame, scan information, a number of cells, and information (a number of LiDAR points or variance) for the included cells.

That is, the key frame is a node of a graph which configures the 3D SLAM and includes 3D LiDAR (light detection and ranging) data information. However, the data is not managed as a 3D point cloud which is raw data entering from the 3D LiDAR, but is reprocessed into a data structure which is easy to edit and has very fast data access to be stored and managed in a structure called a cell. Here, the data structure form is an extended from of binary tree and is configured by an octree structure which is used to recursively represent the 3D space.

The vertex is information representing a key frame having a connection relationship with the other key frame, among the key frames and includes unique identification (ID) of the key frame, a position (pose) of the key frame, and whether to be fixed.

The edge is information representing a connection relationship between nodes (that is, the key frames) of the graph and includes unique identification information (ID) of a key frame which is a reference for observation, unique identification information (ID) of a key frame to be observed, position information to be observed, precision, and variance.

That is, the 3D SLAM data editing apparatus directly edits a key frame or an edge of the 3D SLAM data by manipulation of the user, optimizes the pose graph of the 3D SLAM data based on the key frame or the edge edited by the manipulation of the user to update the 3D SLAM data, and generates a 2D grid map corresponding to the 3D SLAM data based on the updated 3D SLAM data.

To this end, the 3D SLAM data editing apparatus 200 includes an input unit 210, a display unit 230, an editing unit 250, an updating unit 270, and a management unit 290.

The input unit 210 receives the manipulation of the user. The input unit 210 provides the received user manipulation to the management unit 290.

The display unit 230 displays the 3D SLAM data to be edited on a screen by user's manipulation through the input unit 210.

That is, the display unit 230 may perform one of an operation of displaying information (a position, a number of cells, a number of points, and a bounding box size) about the selected key frame on a screen, an operation of displaying information above a vertex which is a selected key frame on the screen, an operation of displaying a cell which is located at a set height, among cells in a selected frame, when the key frame is selected and the height is set, on the screen, an operation of displaying information about a selected edge (unique identification information of a key frame serving as a reference for observation, unique identification information of a key frame to be observed, position information to be observed, and precision) on the screen, and an operation of displaying or hiding a selected target (a selected key frame, a selected cell, among cells in the selected key frame, or a selected edge), in response to the control of the management unit 290.

The editing unit 250 edits a key frame or an edge of the 3D SLAM data to be edited according to user's manipulation through the input unit 210.

That is, the editing unit 250 performs one of an operation of selecting or deselecting the key frame, an operation of changing information in the selected key frame, an operation of removing a cell which is lower or higher than a predetermined height in the selected key frame, an operation of removing a specified cell in the selected key frame, an operation of removing a cell having a number of points which is smaller than a predetermined value, among cells in the selected key frame, and an operation of changing information about a vertex when the selected key frame is a vertex, to edit the key frame of the 3D SLAM data.

At this time, the editing unit 250 performs an operation of editing information (parameter) indicating whether it is an artificial landmark of the cell in the selected key frame, among information in the selected key frame (that is, an operation of changing information in the selected key frame) to edit the artificial landmark of the 3D SLAM data. Here, the artificial landmark refers to a landmark in which the reflection of the laser is smoothly performed so that the laser reflection intensity in the LiDAR is measured to be high, such as a reflector. The SLAM of the present disclosure assigns a large weight to the artificial landmark to be utilized for mapping and optimization.

Further, the editing unit 250 performs one of an operation of selecting or deselecting an edge, an operation of changing information of the selected edge, an operation of removing the selected edge, and an operation of adding a new edge to edit the edge of the 3D SLAM data.

Further, the editing unit 250 performs an automatic editing operation to automatically remove a noise of a cell in the key frame and detect and automatically remove an outlier edge from the pose graph to automatically edit the 3D SLAM data.

For example, the editing unit 250 detects the noise by combining a number of points of the cell, a number of key frames including information about a number of points, covariance, a number of key frames having the corresponding cell, and whether to be artificial landmark and automatically removes the detected noise. The editing unit 250 detects the outlier edge based on the difference from the other vertex and edges and a predetermined reference value using the graph algorithm such as max clique, loop, closure, and automatically removes the detected outlier edge.

The editing unit 250 combines a plurality of 3D SLAM data to be edited according to the user's manipulation through the input unit 210 to acquire combined 3D SLAM data.

That is, the editing unit 250 loads second 3D SLAM data which is a new editing target to first 3D SLAM data which is a current editing target (a key frame and edge set) to combine the first and second 3D SLAM data to acquire combined 3D SLAM data.

At this time, the editing unit 250 controls a reference frame corresponding to the 3D SLAM data to acquire combined 3D SLAM data. For example, the editing unit 250 changes a reference coordinate system (designates as the origin) of the first 3D SLAM data, changes a reference coordinate system of new second 3D SLAM data, and aligns the first and second 3D SLAM data whose reference coordinate system is changed to acquire combined 3D SLAM data.

The updating unit 270 optimizes a pose graph of the 3D SLAM data to be edited based on the key frame or the edge edited by the editing unit 250 to update the 3D SLAM data.

That is, the updating unit 270 performs the pose graph optimization based on the key frame and the edge edited by the editing unit 250 to adjust a key frame position of the pose graph and adjust a position of the vertex based on the adjusted key frame position to update the 3D SLAM data.

In other word, the pose graph configured by key frames and edges before being edited is a graph which has been already optimized in the SLAM process before being edited. However, when the key frame and the edge are edited by the 3D SLAM data editing process according to the present disclosure, in order to reflect the changed content, the pose graph optimization is performed to optimize the pose graph. Here, the optimization refers to a process of adjusting the error to be minimized by adjusting the position of the key frame to the edge information in the pose graph configured by the position of the key frame and the edge information (positions of the other key frame seen from one key frame).

The management unit 290 controls an overall operation (a user authentication function, a data managing function, an editing function, an updating function, a displaying function, a history managing function) of the 3D SLAM data editing apparatus 200 and controls operations of the display unit 230, the editing unit 250, and the updating unit 270 according to the user's manipulation by the input unit 210.

Specifically, the management unit 290 according to the present disclosure may generate a 3D grid map corresponding to the 3D SLAM data based on the 3D SLAM data updated by the updating unit 270.

In the meantime, even though it is illustrated that he 3D SLAM data editing apparatus 200 is one independent device in FIG. 10, the present disclosure is not limited thereto and depending on the exemplary embodiment, may be implemented to various types, such as a server-client type or a software type. For example, the 3D SLAM data editing apparatus 200 according to the present disclosure is included in a server to supply a 3D SLAM data editing function to the client in the form of a web service and the client accesses the server through a user terminal, such as a desktop computer, a notebook, a tablet, or a smart phone to use the 3D SLAM data editing function. Further, the 3D SLAM data editing apparatus 200 according to the present disclosure is implemented as software which is installed in the user terminal to operate to be stored in a server and installs the corresponding software in the user terminal to use the 3D SLAM data editing function.

Now, a process of editing 3D SLAM data according to the second embodiment of the present disclosure will be described with reference to FIGS. 11 to 13.

Figure 11:
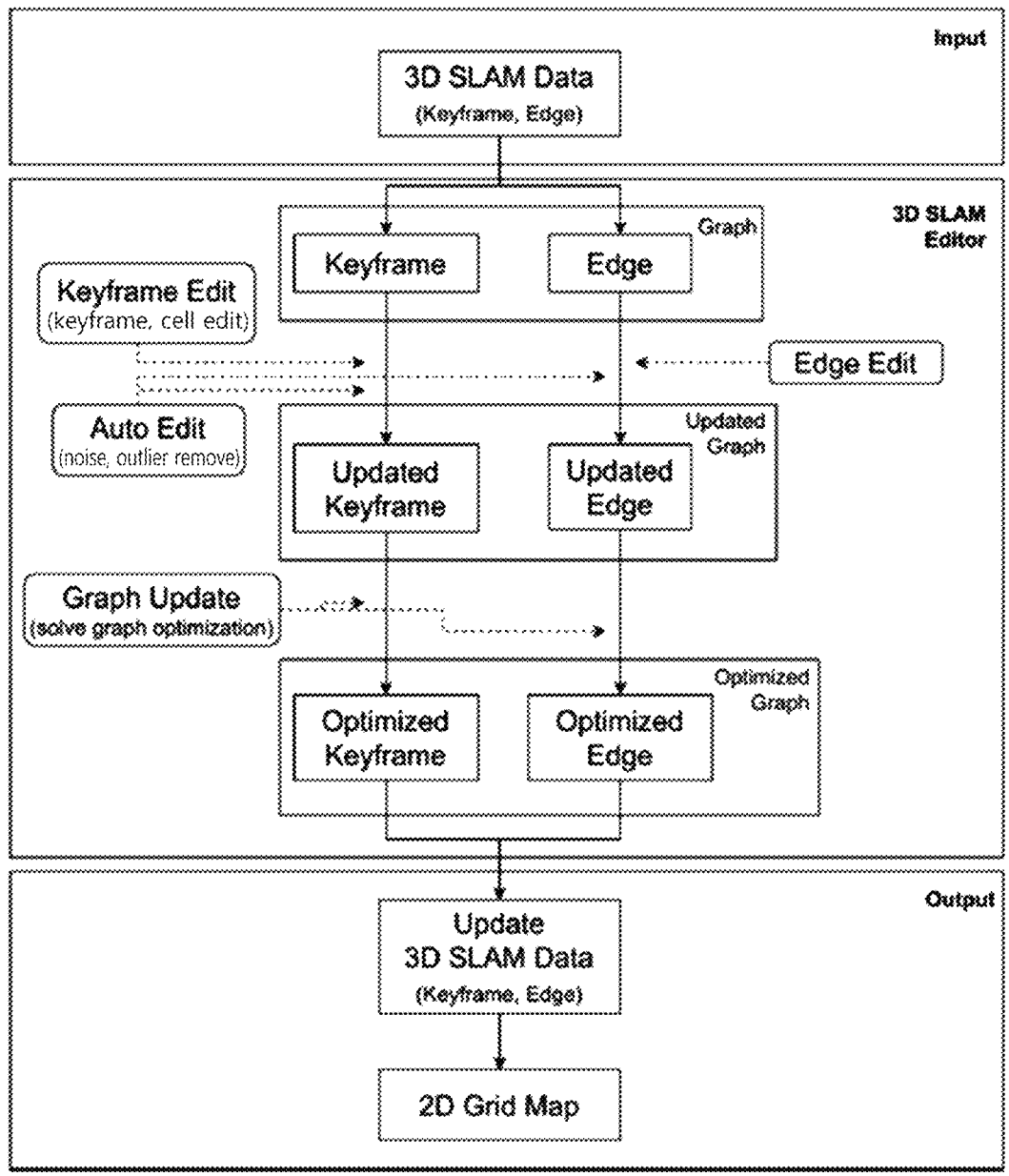
FIG. 11 is a view for explaining a 3D SLAM data editing process according to a second exemplary embodiment of the present disclosure.
Figure 12:
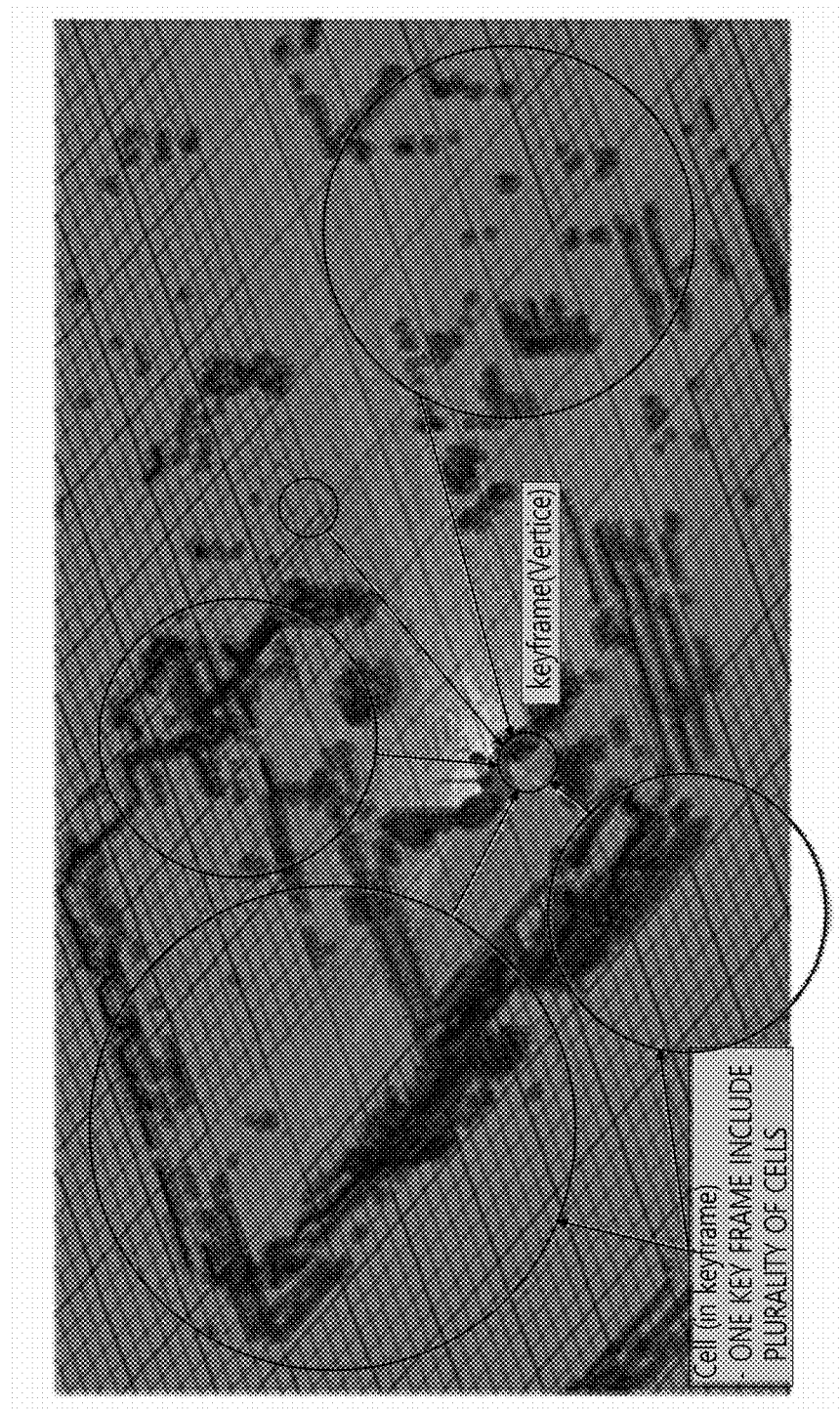
FIG. 12 is a view for explaining an example of 3D SLAM data according to a second exemplary embodiment of the present disclosure.
Figure 13:
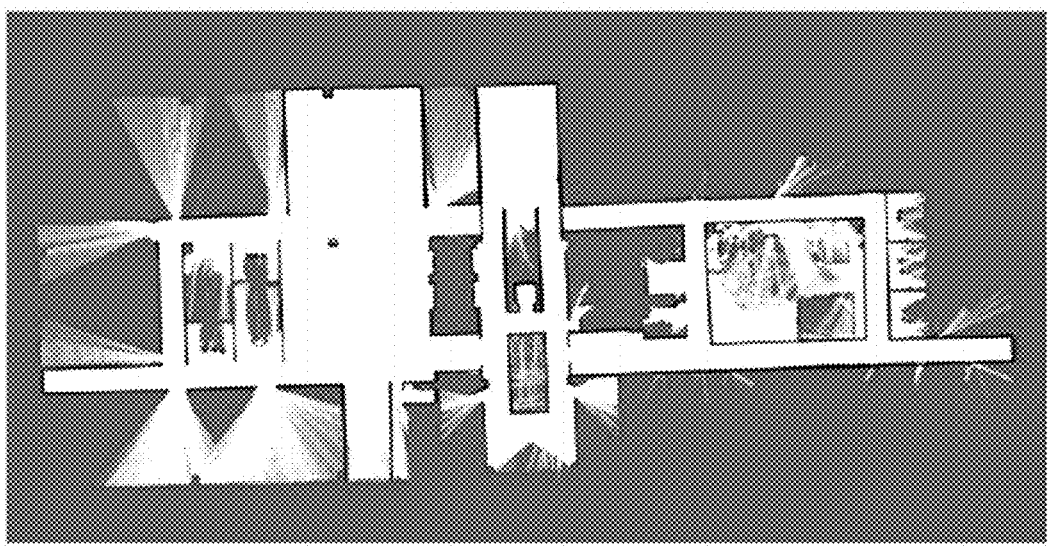
FIG. 13 is a view for explaining an example of a 2D grid map according to a second exemplary embodiment of the present disclosure.

FIG. 11 is a view for explaining a 3D SLAM data editing process according to a second exemplary embodiment of the present disclosure, FIG. 12 is a view for explaining an example of 3D SLAM data according to a second exemplary embodiment of the present disclosure, and FIG. 13 is a view for explaining an example of a 2D grid map according to a second exemplary embodiment of the present disclosure.

Referring to FIG. 11, when 3D SLAM data (see FIG. 12) to be edited is input, the 3D SLAM data editing apparatus 200 edits the key frame of the 3D SLAM data to be edited or edits an edge of the 3D SLAM data to be edited, or automatically edits the 3D SLAM data to be edited, in accordance with the user's manipulation.

By doing this, the key frame or the edge of the graph is updated and the 3D SLAM data editing apparatus may optimize a pose graph of the 3D SLAM data based on the updated (that is, edited) key frame or edge to update the graph.

By doing this, the graph is optimized and the 3D SLAM data editing apparatus 200 provides the optimized (that is, updated) 3D SLAM data as an output and generates and provides a 2D grid map (see FIG. 13) corresponding to the optimized (that is, updated) 3D SLAM data.

Now, a configuration of an editing screen of 3D SLAM data according to the second embodiment of the present disclosure will be described with reference to FIGS. 14 and 15.

Figure 14:
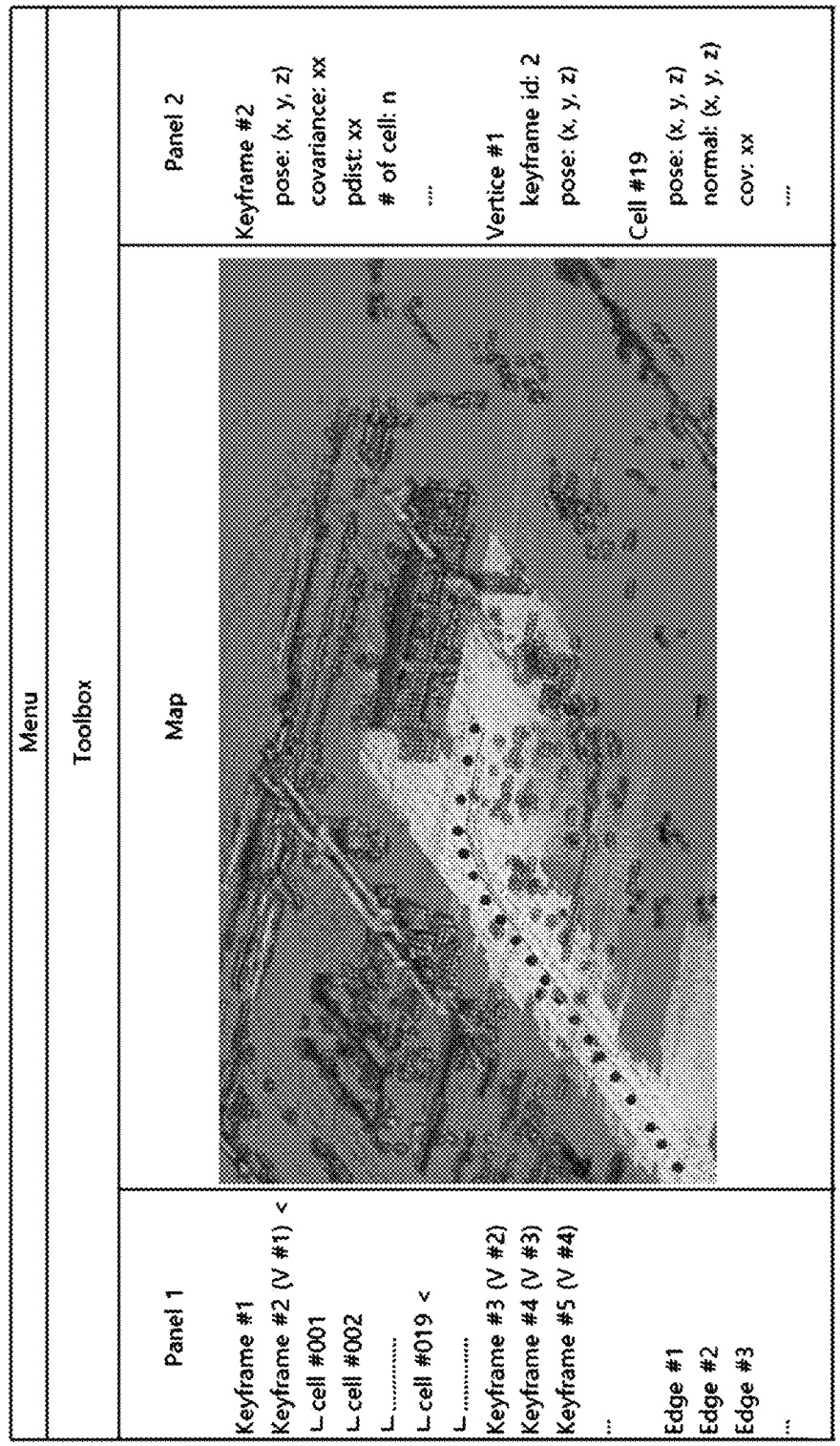
FIG. 14 is a view for explaining an editing screen configuration of 3D SLAM data according to a second exemplary embodiment of the present disclosure.

FIG. 14 is a view for explaining an editing screen configuration of 3D SLAM data according to a second exemplary embodiment of the present disclosure. FIG. 15 is a view for explaining an implemented example of an editing screen configuration of 3D SLAM data illustrated in FIG. 14.

Figure 15:
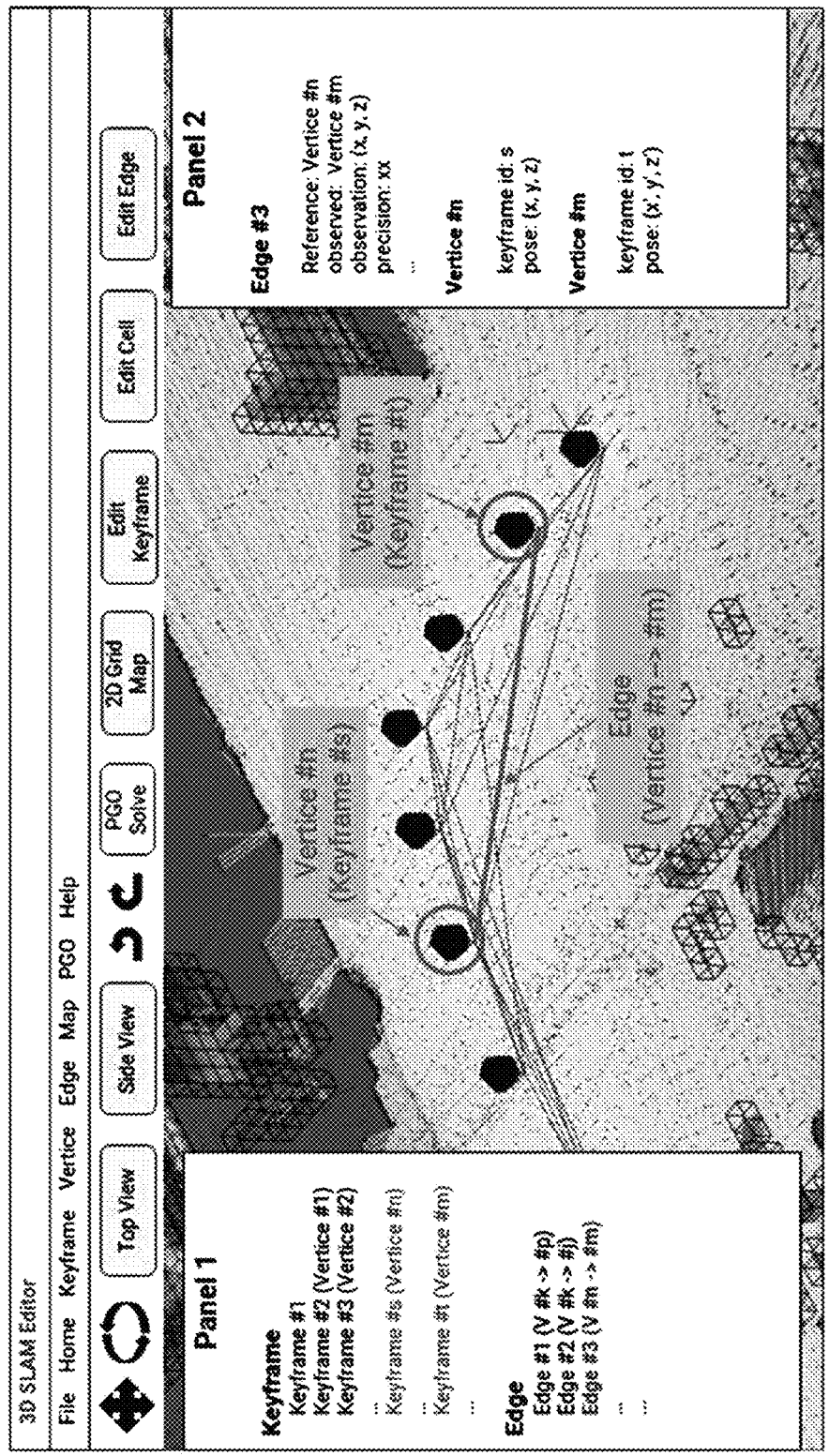
FIG. 15 is a view for explaining an implemented example of an editing screen configuration of 3D SLAM data illustrated in FIG. 14.

Referring to FIGS. 14 and 15, the editing screen of the 3D SLAM data is configured by a "Menu" item, a "Toolbox" item, a "Panel 1" item, a "Panel 2" item, and a "Map" item.

The "Menu" item displays functions for executing various functions supported by the 3D SLAM data editor according to the present disclosure.

"Toolbox" item displays frequently used functions.

The "Panel 1" item displays a list of information (that is, unique identification information) about a key frame and an edge of the 3D SLAM data to be edited.

The "Panel 2" item displays information about a target (a selected key frame, a selected cell, or a selected edge) selected by the user's manipulation, among the list displayed in the "Panel 1" item.

The "Map" item displays 3D SLAM data to be edited and when a specific target (a key frame, a cell, or an edge) is selected, displays a corresponding portion.

Now, a method for editing 3D SLAM data according to the second embodiment of the present disclosure will be described with reference to FIG. 16.

Figure 16:
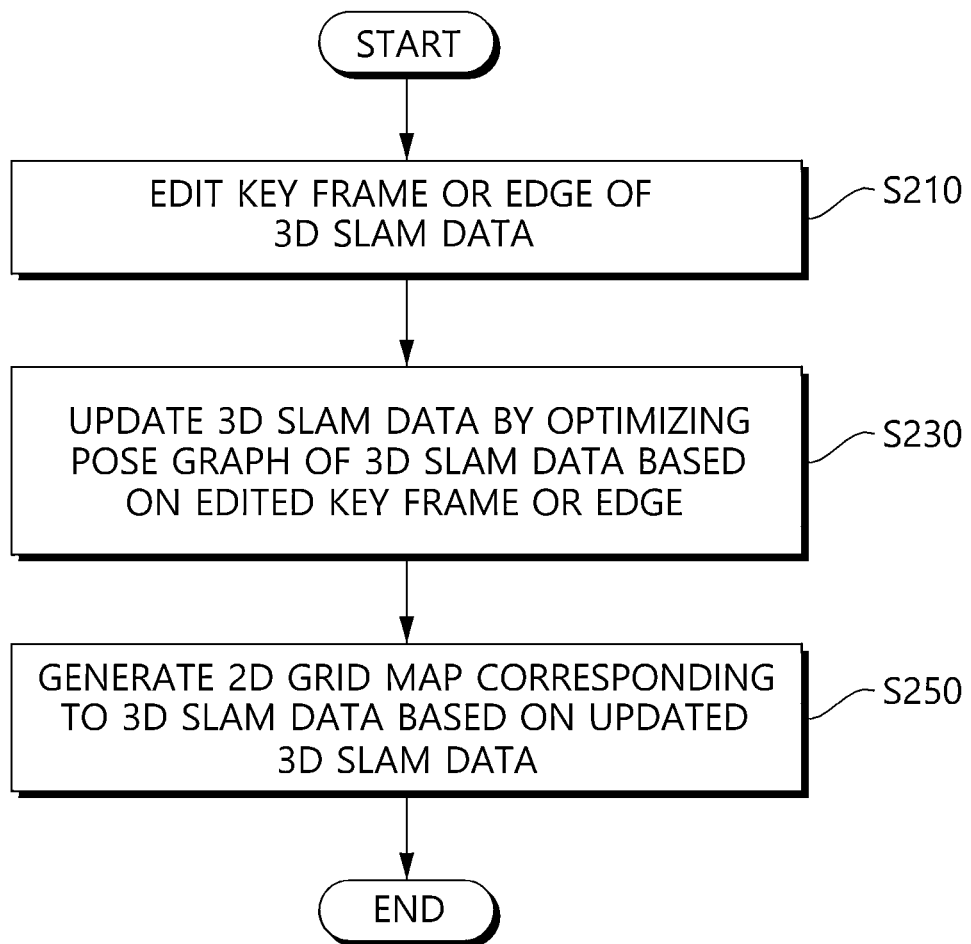
FIG. 16 is a block diagram for explaining a 3D SLAM data editing apparatus according to a second exemplary embodiment of the present disclosure.

FIG. 16 is a block diagram for explaining a 3D SLAM data editing apparatus according to a second exemplary embodiment of the present disclosure.

Referring to FIG. 16, the 3D SLAM data editing apparatus 200 edits the key frame or the edge of the 3D SLAM data according to the user's manipulation (S210).

That is, the 3D SLAM data editing apparatus 200 performs one of an operation of selecting or deselecting the key frame, an operation of changing information in the selected key frame, an operation of removing a cell which is lower or higher than a predetermined height in the selected key frame, an operation of removing a specified cell in the selected key frame, an operation of removing a cell in which a number of points is smaller than a predetermined value, among cells in the selected key frame, and an operation of changing information about a vertex when the selected key frame is a vertex, to edit the key frame of the 3D SLAM data.

At this time, the 3D SLAM data editing apparatus 200 performs an operation of editing information indicating whether it is an artificial landmark of the cell in the selected key frame, among information in the selected key frame (that is, an operation of changing information in the selected key frame) to edit the artificial landmark of the 3D SLAM data. Further, the 3D SLAM data editing apparatus 200 performs an operation of selecting or deselecting an edge, an operation of changing information of the selected edge, an operation of removing the selected edge, and an operation of adding a new edge to edit the edge of the 3D SLAM data.

Further, the 3D SLAM data editing apparatus 200 performs an automatic editing operation to automatically remove a noise of a cell in the key frame and detect and automatically remove an outlier edge from the pose graph to automatically edit the 3D SLAM data.

The 3D SLAM data editing apparatus 200 combines a plurality of 3D SLAM data to be edited according to the user's manipulation to acquire combined 3D SLAM data.

By doing this, the 3D SLAM data editing apparatus 200 optimizes a pose graph of 3D SLAM data based on the edited key frame or edge to update the 3D SLAM data (S230).

That is, the 3D SLAM data editing apparatus 200 performs the pose graph optimization based on the key frame and the edge edited by the editing unit 250 to adjust a key frame position of the pose graph and adjusts a position of the vertex based on the adjusted key frame position to update the 3D SLAM data.

Next, the 3D SLAM data editing apparatus 200 generates a 2D grid map corresponding to the 3D SLAM data based on the updated 3D SLAM data (S250).

<Third Exemplary Embodiment: Apparatus for Detecting and Removing Dynamic Obstacle of Robot and Operating Method Thereof>

An apparatus for detecting and removing a dynamic obstacle of a robot and an operating method thereof which are a third exemplary embodiment of a robot system according to the present disclosure will be described in detail with reference to FIGS. 17 to 21.

An apparatus for detecting and removing a dynamic obstacle of a robot according to the third exemplary embodiment of the present disclosure will be described with reference to FIGS. 17 to 19.

Figure 17:
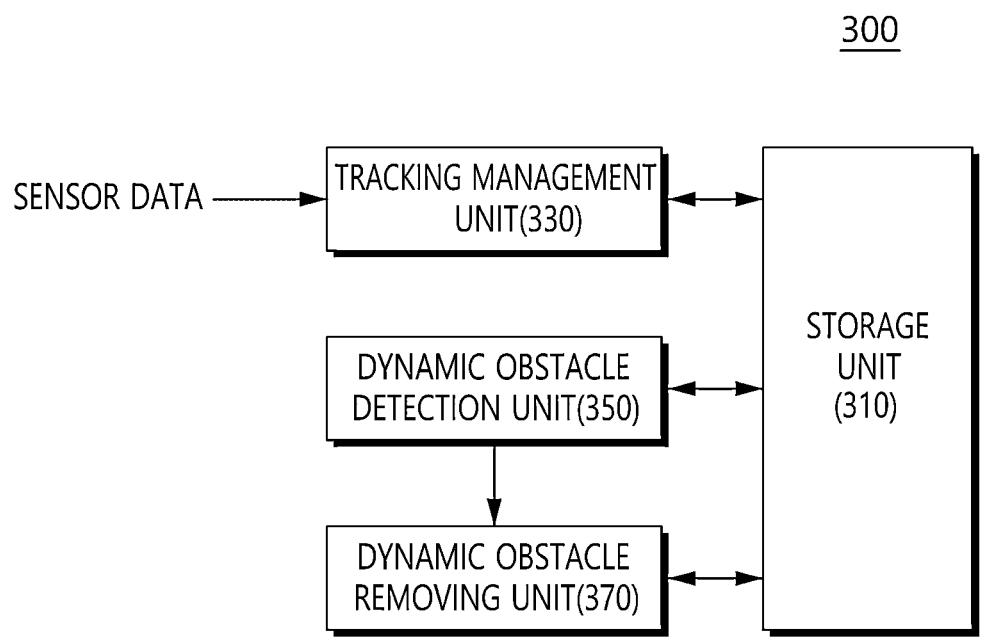
FIG. 17 is a block diagram for explaining an apparatus of detecting and removing a dynamic obstacle of a robot according to a third exemplary embodiment of the present disclosure.
Figure 18:
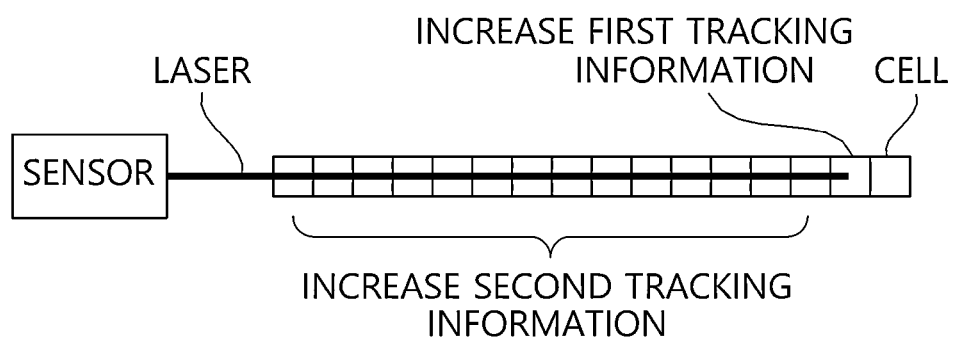
FIG. 18 is a view for explaining an example of an operation of updating tracking information according to a third exemplary embodiment of the present disclosure.

FIG. 17 is a block diagram for explaining an apparatus of detecting and removing a dynamic obstacle of a robot according to a third exemplary embodiment of the present disclosure, FIG. 18 is a view for explaining an example of an operation of updating tracking information according to a third exemplary embodiment of the present disclosure, and. FIG. 19 is a view for explaining an example of an operation of updating tracking information according to a third exemplary embodiment of the present disclosure.

Referring to FIG. 17, an apparatus for detecting and removing a dynamic obstacle of robot according to the third exemplary embodiment of the present disclosure (hereinafter, referred to as "dynamic obstacle detecting and removing apparatus) 300 detects and removes the dynamic obstacle while simultaneously performing the map building and localization using a simultaneous localization and mapping (SLAM) technique.

Here, the present disclosure is applicable to household cleaning robots, public building cleaning robots, logistics robots, service robots, as well as industrial robots.

To this end, the dynamic obstacle detecting and removing apparatus 300 includes a storage unit 310, a tracking management unit 330, a dynamic obstacle detection unit 350, and a dynamic obstacle removing unit 370.

The storage unit 310 serves to store a program and data required for an operation of the dynamic obstacle detecting and removing apparatus 300 and is divided into a program area and a data area. The program area may store an application program which is required for an operation of a program which controls an overall operation of the dynamic obstacle detecting and removing apparatus 300, such as an operating system (OS) which boots the dynamic obstacle detecting and removing apparatus 300, and an application program required for the operation of the dynamic obstacle detecting and removing apparatus 300, such as update of accumulated sensing time information of the cell, update of cell tracking information, detection of a dynamic obstacle, or removal of a dynamic obstacle. In the data area, data generated as the dynamic obstacle detecting and removing apparatus 300 is used is stored and a map, an initial time information the cell, accumulated sensing signal information, and a cell tracking information may be stored.

Here, the map is configured by a cell with a predetermined size (3 cm) and is configured by a 3D coordinate space.

At this time, the data structure of the cell of the map is configured as an Octree data structure. Due to the characteristic of the SLAM technique which needs to operate in real time, a series of object detecting and removing method with a larger number of data accesses requires optimized data access. To this end, the cell according to the present disclosure uses an Octree method with a data structure.

That is, the Octree data structure is a tree type data structure in which one intermediate node has eight son nodes so that the cell of the map is expressed by an octree data structure, the access speed to the 3D space may be improved. In the case of the naive implementation using KD-tree, there is a problem in that too many memories are used or it takes a long time to search.

The tracking management unit 330 manages the tracking information of the cell used to detect the dynamic obstacle for every cell of a map stored in the storage unit 310, based on sensor data acquired from the sensor mounted in the robot.

Here, the tracking information includes first tracking information representing how many times the laser is focused on the cell and second tracking information representing how many times the laser passes through the cell.

That is, when the tracking management unit 330 receives the sensor data from the sensor mounted in the robot, the tracking management unit 330 inputs the sensor data to the map, updates accumulated sensing time information of the cell for every cell of the map, based on the cell sensed by the sensor data, and updates cell tracking information for every cell of the map based on whether the laser acquired from the sensor data passes through the cell. At this time, when the sensor data is provided from the sensor mounted in the robot, the tracking management unit 330 corrects a position using an existing map of the sensor data, inputs sensor data with a corrected position to the map, updates the accumulated sensing time information based on the sensor data with the corrected sensor data, and updates the cell tracking information based on the corrected sensor data.

To be more specific, the tracking management unit 330 acquires initial time information of the cell which is initially sensed, among cells sensed by the sensor data and updates the accumulated sensing signal information based on the minimum time information of the remaining cell.

The tracking management unit 330, as illustrated in FIG. 18, increases second tracking information of a cell through the laser passes by a predetermined unit ("1") and increases first tracking information for a cell on which the laser is focused, by a predetermined unit ("1").

For example, in the case of the cell through the laser passes, the first tracking information maintains the existing value and the second tracking information is updated to "an existing value of the second tracking information+the predetermined unit". In contrast, in the case of the cell on which the laser is focused, the first tracking information is updated to "the existing value of the first tracking information +the predetermined unit" and the second tracking information maintains "the existing value".

Figure 19:
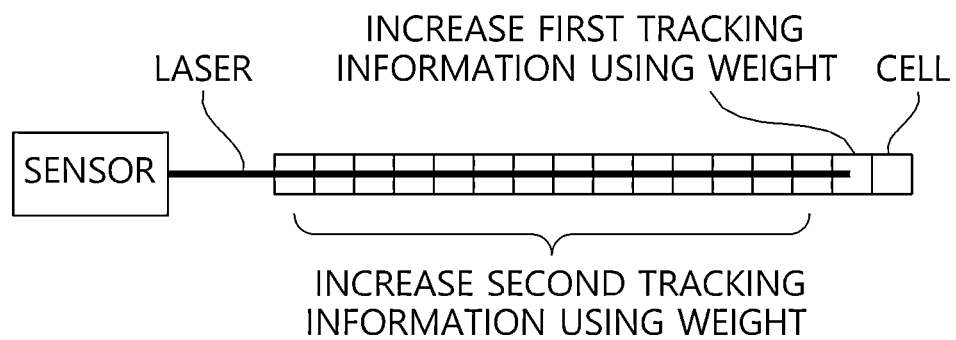
FIG. 19 is a view for explaining an example of an operation of updating tracking information according to a third exemplary embodiment of the present disclosure.

At this time, the tracking management unit 330, as illustrated in FIG. 19, acquires the weight based on a distance between the cell and the sensor and a resolution of the sensor and acquires the first tracking information and the second tracking information of the cell using the weight.

That is, the weight may be calculated by the following Equation 1.

$$\text{weight} = \frac{1}{\text{distance}} \times \text{sensor frequency} \qquad \text{[Equation 1]}$$

Here, "weight" indicates the weight. "distance" indicates a distance between the cell and sensor, is calculated by $\sqrt{x^2+y^2+z^2}$, and (x,y,z) indicates a coordinate value of the cell. "sensor frequency" indicates a resolution of the sensor. For example, in the case of the 3D LiDAR, one laser sensor sequentially sweeps from the top 45 degrees to the bottom −45 degrees for 1.6 seconds and it takes 3.2 seconds to reach from the top to the top. In this case, the resolution of the sensor is calculated by $$\frac{1}{3.2} \times \text{tuning factor}$$

and the turning factor indicates a predetermined value for the sensor.

For example, in the case of the cell through the laser passes, the first tracking information maintains the existing value and the second tracking information is updated by "(an existing value of the second tracking information +predetermined unit)*a weight of the corresponding cell".

That is, the second tracking information is calculated by the following "Equation 2".

$$\text{miss}(t)=(\text{miss}(t-1)+\text{number of miss})\times\text{weight} \qquad (2)$$

Here, miss(t) represents second tracking information (miss) at t. Here, miss(t−1) represents second tracking information (miss) at t−1. Number of miss indicates a predetermined unit, such as a number of cells through which the laser passes. "weight" indicates the weight.

In contrast, in the case of the cell on which the laser is focused, the first tracking information is updated to "(the existing value of the first tracking information+the predetermined unit)*a weight of the corresponding cell" and the second tracking information maintains "the existing value".

That is, the first tracking information is calculated by the following "Equation 3".

$$\text{hit}(t)=(\text{hit}(t-1)+\text{number of hit})\times\text{weight} \qquad (3)$$

Here, hit(t) represents first tracking information (hit) at t. hit(t−1) represents first tracking information (hit) at t−1. "number of hit" indicates a predetermined unit, such as a number of cells on which the laser is focused. "weight" indicates the weight.

That is, according to the characteristic of the LiDAR, a density of the sensor data changes according to a distance from the sensor. In order to detect and remove a moving object at a long distance, according to the present disclosure, when the first tracking information and the second tracking information are calculated, a weight obtained using the distance from the sensor and the sensor resolution is multiplied.

The dynamic obstacle detection unit 350 acquires whether the cell is a dynamic obstacle based on accumulated sensing time information for every cell of the map and the tracking information, which are updated by the tracking management unit 330.

That is, the dynamic obstacle detection unit 350 detects whether a cell whose accumulated sensing time information is larger than a predetermined reference time is a dynamic obstacle based on an obstacle presence probability and first tracking information.

For example, when the obstacle is detected at t=0, is not detected at t=1, and is not detected at t=3, it is a situation in which the presence of the obstacle should be suspected. That is, when the obstacle cannot consistently detected, in order to remove the corresponding content, a reference can be set, which needs to be set by a manager in advance.

Here, the obstacle presence probability is acquired based on the first tracking information and the second tracking information. For example, the obstacle presence probability (p) may be obtained by dividing the first tracking information (hit) by a sum of the first tracking information (hit) and the second tracking information (miss), as represented in the following Equation 4.

$$p = \frac{hit}{hit + miss} = \frac{\sum_{i=0}^{n} hit(i)}{\sum_{i=0}^{n} hit(i) + \sum_{i=0}^{n} miss(i)}$$ [Equation 4]

For example, the dynamic obstacle detection unit 350 detects a cell in which the obstacle presence probability is equal to or lower than a predetermined first reference value and the first tracking information is equal to or lower than a predetermined second reference value as a dynamic obstacle.

Here, the first reference value may be 50%. The second reference value may be calculated by the following Equation 5.

Second reference value=(sensor frequency×time)/10     (5)

The dynamic obstacle removing unit 370 removes data corresponding to a cell which is detected as a dynamic obstacle by the dynamic obstacle detection unit 350 from the map.

Now, an effect of an operation of detecting and removing a dynamic obstacle of a robot according to a third exemplary embodiment of the present disclosure will be described with reference to FIG. 20.

Figure 20:
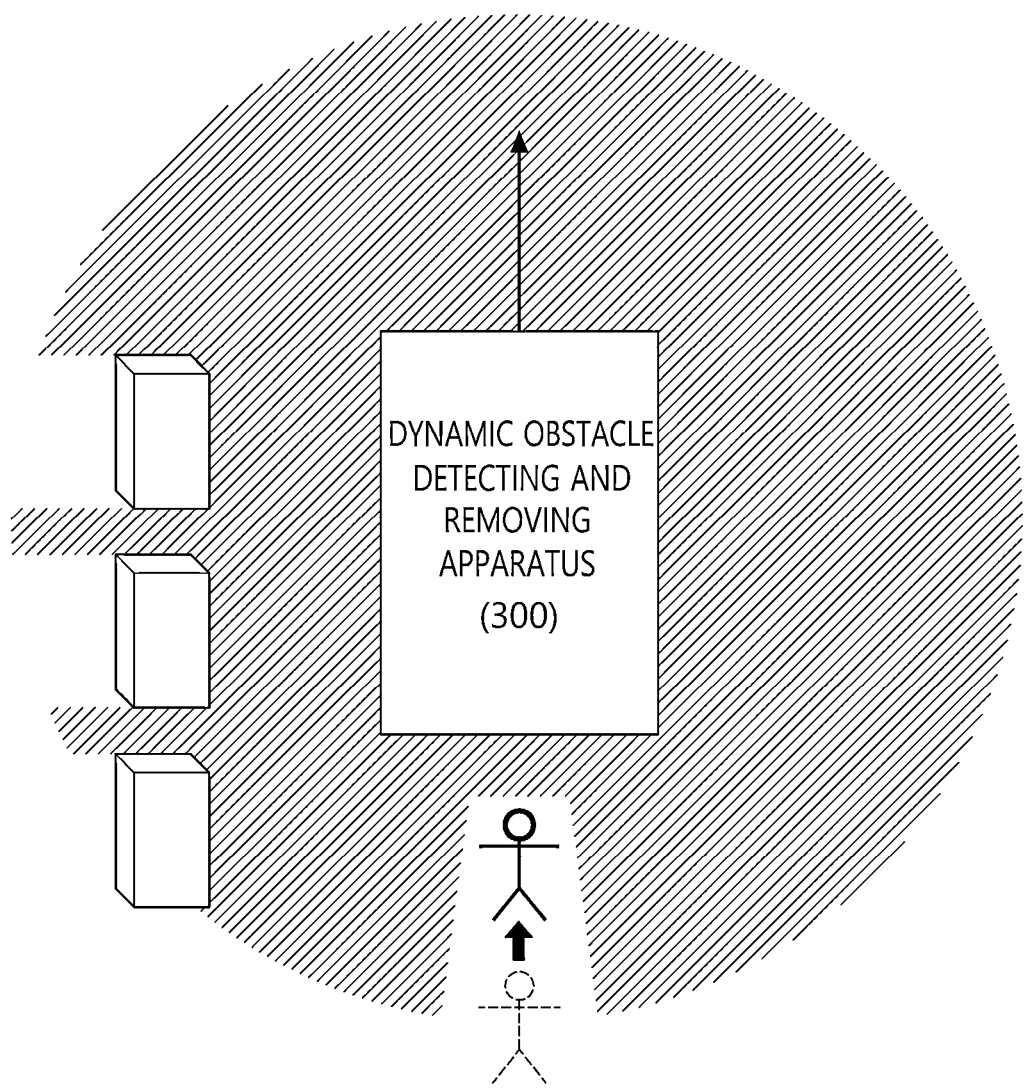
FIG. 20 is a block diagram for explaining an effect of an operation of detecting and removing a dynamic obstacle according to a third exemplary embodiment of the present disclosure.

FIG. 20 is a block diagram for explaining an effect of an operation of detecting and removing a dynamic obstacle according to a third exemplary embodiment of the present disclosure.

Referring to FIG. 20, according to the present disclosure, also an object which approaches the robot is also detected and removed using the tracking information of the cell and the accumulated sensing time information of the cell are used together. That is, a problem in that the object is blocked by an object which approaches the robot so that a previous movement trajectory of the object cannot be detected is solved.

Now, an operating method of an apparatus of detecting and removing a dynamic obstacle of a robot according to a third exemplary embodiment of the present disclosure will be described with reference to FIG. 21.

Figure 21:
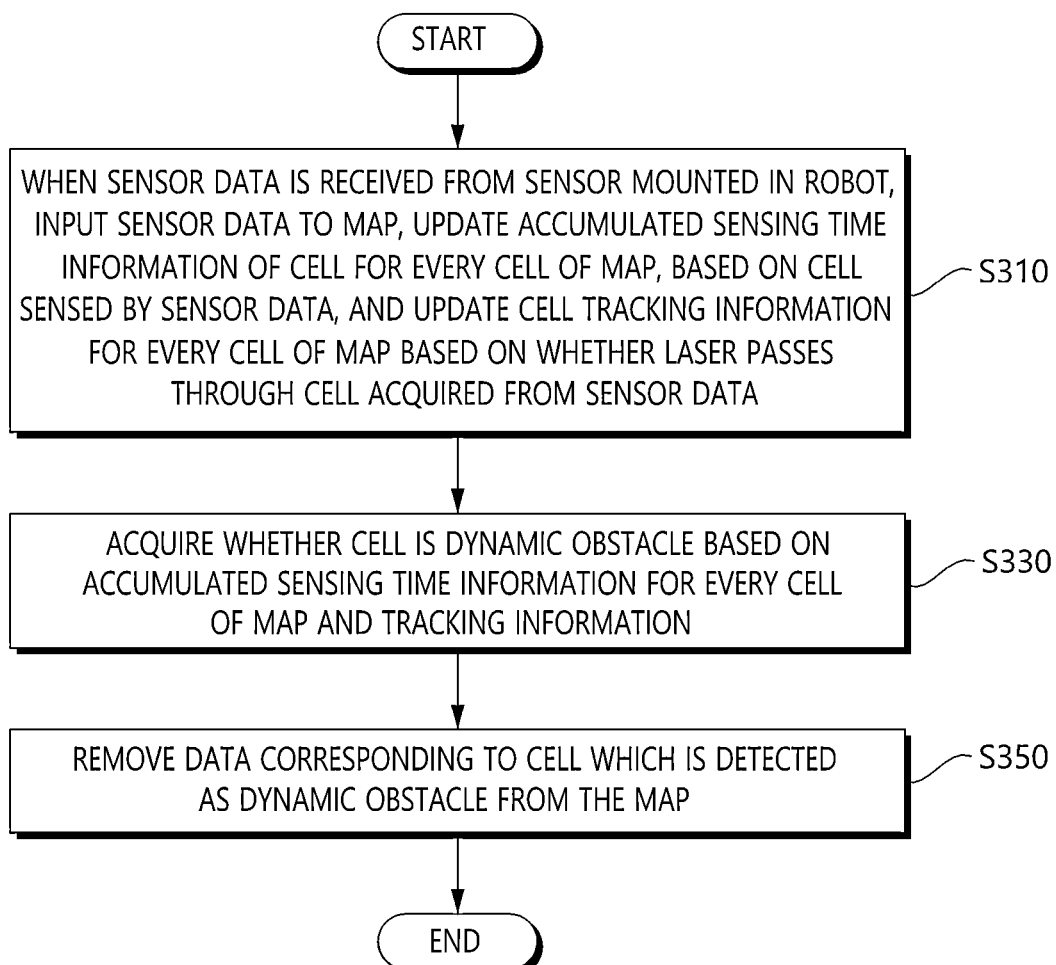
FIG. 21 is a block diagram for explaining an apparatus of detecting and removing a dynamic obstacle of a robot according to a third exemplary embodiment of the present disclosure.

FIG. 21 is a block diagram for explaining an apparatus of detecting and removing a dynamic obstacle of a robot according to a third exemplary embodiment of the present disclosure.

Referring to FIG. 21, when the dynamic obstacle detecting and removing apparatus 300 receives the sensor data from the sensor mounted in the robot, the tracking management unit 330 inputs the sensor data to the map, updates accumulated sensing time information of the cell for every cell of the map, based on the cell sensed by the sensor data, and updates cell tracking information for every cell of the map based on whether the laser acquired from the sensor data passes through the cell (S310). At this time, when the sensor data is provided from the sensor mounted in the robot, the dynamic obstacle detecting and removing apparatus 300 corrects a position using an existing map of the sensor data, inputs sensor data with a corrected position to the map, updates the accumulated sensing time information based on the sensor data with the corrected sensor data, and updates the cell tracking information based on the corrected sensor data.

To be more specific, the dynamic obstacle detecting and removing apparatus 300 acquires initial time information of the cell which is initially sensed, among cells sensed by the sensor data and updates the accumulated sensing signal information based on the minimum time information of the remaining cell.

The dynamic obstacle detecting and removing apparatus 300 increases second tracking information of a cell through which the laser passes by a predetermined unit and increases first tracking information of the cell on which laser is focused by a predetermined unit, based on the sensor data.

At this time, the dynamic obstacle detecting and removing apparatus 300 acquires a weight based on a distance between the cell and the sensor and the resolution of the sensor and acquires the first tracking information and the second tracking information of the cell using the weight.

Next, the dynamic obstacle detecting and removing apparatus 300 acquires whether the cell is a dynamic obstacle based on the accumulated sensing time information for every cell of the map and the tracking information (S330).

That is, the dynamic obstacle detecting and removing apparatus 300 detects whether a cell whose accumulated sensing time information is larger than a predetermined reference time is a dynamic obstacle based on an obstacle presence probability and first tracking information. Here, the obstacle presence probability is acquired based on the first tracking information and the second tracking information.

For example, the obstacle detecting and removing apparat 300 detects a cell in which the obstacle presence probability is equal to or lower than a predetermined first reference value and the first tracking information is equal to or lower than a predetermined second reference value as a dynamic obstacle.

The obstacle detecting and removing apparat 300 removes data corresponding to a cell which is detected as a dynamic obstacle from the map (S350).

Even though it has been described above that all components of the exemplary embodiment of the present disclosure are combined as one component or operate to be combined, the present disclosure is not limited to the exemplary embodiment. In other words, one or more components may be selectively combined to be operated within a scope of the present disclosure. Further, all components may be implemented as one independent hardware but a part or all of the components are selectively combined to be implemented as a computer program which includes a program module which performs a part or all functions combined in one or plural hardwares. Further, such a computer program may be stored in a computer readable media such as a USB memory, a CD disk, or a flash memory to be read and executed by a computer to implement the exemplary embodiment of the present disclosure. The recording media of the computer program may include a magnetic recording medium or an optical recording medium.

The above description illustrates a technical spirit of the present disclosure as an example and various changes, modifications, and substitutions become apparent to those skilled in the art within a scope of an essential characteristic of the present disclosure. Therefore, as is evident from the foregoing description, the exemplary embodiments and accompanying drawings disclosed in the present disclosure do not limit the technical spirit of the present disclosure and the scope of the technical spirit is not limited by the exemplary embodiments and accompanying drawings. The protective scope of the present disclosure should be construed based on the following claims, and all the technical concepts in the equivalent scope thereof should be construed as falling within the scope of the present disclosure.

What is claimed is:

1. An apparatus for detecting and removing a dynamic obstacle of a robot, comprising:
    a storage unit which stores a map configured by cells with a predetermined size and configured by a 3D coordinate space;
    a tracking management unit which when sensor data is received from a sensor mounted in a robot, inputs the sensor data to the map, updates accumulated detecting time information of a cell, based on the cell detected by the sensor data, for every cell of the map, and updates cell tracking information for every cell of the map based on whether the laser obtained from the sensor data passes through the cell;
    a dynamic obstacle detecting unit which is updated by the tracking management unit and determines whether the cell is a dynamic obstacle based on the accumulated detecting time information for every cell of the map and the cell tracking information; and
    a dynamic obstacle removing unit which removes data corresponding to the cell which is determined as a dynamic obstacle by the dynamic obstacle detecting unit from the data,
    wherein the cell tracking information includes first tracking information indicating how many times the laser is focused on the cell and second tracking information indicating how many times the laser passes though the cell, and the tracking management unit increases the second tracking information of the cell through which the laser passes by a predetermined unit and increases the first tracking information of the cell on which the laser is focused, based on the sensor data,
    wherein the tracking management unit calculates a weight based on i) a distance between the cell and the sensor and ii) a resolution of the sensor, and calculates the first tracking information and the second tracking information of the cell using the calculated weight.

2. The apparatus for detecting and removing a dynamic obstacle of a robot according to claim 1, wherein the tracking management unit acquires initial time information of the cell which is initially sensed, among cells sensed by the sensor data and updates the accumulated sensing signal information based on minimum time information of a remaining cell.

3. The apparatus for detecting and removing a dynamic obstacle of a robot according to claim 1, wherein the dynamic obstacle detecting unit determines whether the cell whose accumulated sensing time information is larger than a predetermined reference time is a dynamic obstacle based on an obstacle presence probability and first tracking information and the obstacle presence probability is acquired based on the first tracking information and the second tracking information.

4. The apparatus for detecting and removing a dynamic obstacle of a robot according to claim 3, wherein the dynamic obstacle detecting unit determines the cell in which the obstacle presence probability is equal to or lower than a predetermined first reference value and the first tracking information is equal to or lower than a predetermined second reference value as a dynamic obstacle.

5. The apparatus for detecting and removing a dynamic obstacle of a robot according to claim 3, wherein the obstacle presence probability is obtained by dividing the first tracking information by a sum of the first tracking information and the second tracking information.

6. The apparatus for detecting and removing a dynamic obstacle of a robot according to claim 1, wherein when the sensor data is provided from a sensor mounted in the robot, the tracking management unit corrects a position of the sensor data, inputs the sensor data from which the position is corrected to the map, updates accumulated sensing time information of the cell based on the sensor data from which the position is corrected, and updates the tracking information of the cell based on the sensor data from which the position is corrected.

7. The apparatus for detecting and removing a dynamic obstacle of a robot according to claim 1, wherein the data structure of the cell of the map is configured as an octree data structure.

8. An operating method of an apparatus for detecting and removing a dynamic obstacle of a robot, comprising:
    inputting, when sensor data is provided from a sensor mounted in a robot, the sensor data to a map which is configured by a cell with a predetermined size and configured by a 3D coordinate space, updating accumulated detecting time information of the cell, based on the cell detected by the sensor data, for every cell of the map, and updating cell tracking information for every cell of the map based on whether the laser obtained from the sensor data passes through the cell;
    determining whether the cell is a dynamic obstacle based on accumulated sensing time information for every cell of the map and the cell tracking information; and
    removing data corresponding to the cell determined as a dynamic obstacle from the map,
    wherein the cell tracking information includes first tracking information indicating how many times the laser is focused on the cell and second tracking information indicating how many times the laser passes though the cell,
    wherein the updating of the cell tracking information for every cell of the map includes:
        increasing second tracking information of the cell through which the laser passes by a predetermined unit and increasing the first tracking information of the cell on which the laser is focused, based on the sensor data, and
        calculating a weight based on i) a distance between the cell and the sensor and ii) a resolution of the sensor, and calculating the first tracking information and the second tracking information of the cell using the calculated weight.

9. The operating method according to claim 8, wherein the updating of accumulated sensing time information of the cell, based on the cell detected by the sensor data, for every cell of the map includes:

acquiring initial time information of the cell which is initially sensed, among cells sensed by the sensor data and updating the accumulated sensing signal information based on the minimum time information of a remaining cell.

10. The operating method according to claim 8, wherein the determining whether the cell is a dynamic obstacle includes:
   determining whether the cell whose accumulated sensing time information is larger than a predetermined reference time is a dynamic obstacle based on an obstacle presence probability and first tracking information and
   the obstacle presence probability is acquired based on the first tracking information and the second tracking information.

11. The operating method according to claim 10, wherein the determining whether the cell is a dynamic obstacle includes:
   determining the cell in which the obstacle presence probability is equal to or lower than a predetermined first reference value and the first tracking information is equal to or lower than a predetermined second reference value as a dynamic obstacle.

12. The operating method according to claim 10, wherein the obstacle presence probability is obtained by dividing the first tracking information by a sum of the first tracking information and the second tracking information.

13. The operating method according to claim 8, wherein the data structure of the cell of the map is configured as an octree data structure.

14. A computer program stored in a non-transitory computer readable recording medium to allow a computer to execute the method of an apparatus for detecting and removing a dynamic obstacle of a robot according to claim 8.

* * * * *